United States Patent [19]

Lubarsky et al.

[11] Patent Number: 4,924,460

[45] Date of Patent: May 8, 1990

[54] OFFICE CONTROL UNIT APPARATUS FOR USE IN A DIGITAL NETWORK

[75] Inventors: Daniel P. Lubarsky, San Jose; George A. Weight, Livermore; Mark E. Haisch, Freemont, all of Calif.

[73] Assignee: Pacific Bell, San Francisco, Calif.

[21] Appl. No.: 254,236

[22] Filed: Oct. 5, 1988

[51] Int. Cl.$^5$ .............................. H04J 3/22; H04J 3/12
[52] U.S. Cl. ..................................... 370/84; 370/110.1
[58] Field of Search ..................... 370/58.2, 60, 67, 84, 370/94.1, 79, 17, 110.1, 77

[56] References Cited

U.S. PATENT DOCUMENTS

| | | | |
|---|---|---|---|
| 4,615,028 | 9/1986 | Lewis et al. | 370/110.1 |
| 4,616,360 | 10/1986 | Lewis | 370/67 |
| 4,635,253 | 1/1987 | Urui et al. | 370/84 |
| 4,658,152 | 4/1987 | Walters | 370/84 |

OTHER PUBLICATIONS

Dunbar, B. J. et al., "Dataport-Channel Units for Digital Data System 56-kb/s Rate", *The Bell System Technical Journal*, vol. 61, No. 9, Nov. 1982, pp. 2741-2756.
Albert, W. G. et al., "Digital Terminal Physical Design", *The Bell System Technical Journal*, vol. 61, No. 9, Nov. 1982, pp. 2757-2790.

*Primary Examiner*—Douglas W. Olms
*Assistant Examiner*—Wellington Chin
*Attorney, Agent, or Firm*—McCubbrey, Bartels, Meyer & Ward

[57] ABSTRACT

An office control unit apparatus for transferring digital data between subscriber loops and the time-domain multiplexed communication channels of a multipoint telephone communication network is described. The office control unit receives digital data at its time-domain multiplexed input port and at its loop data input port. In addition to user data, the digital data can include network commands which are processed by the office control unit and acted upon if appropriate. The office control unit is assigned a unique address and can communicate with other network units in response to predefined commands. Data transmitted on the time-domain multiplexed communication channels can be encrypted and the office control unit can process that encrypted data, noting transmission errors and performing majority decision logic where appropriate. Data can be injected into the outgoing data stream at the time-domain multiplexed and loop output ports.

14 Claims, 6 Drawing Sheets

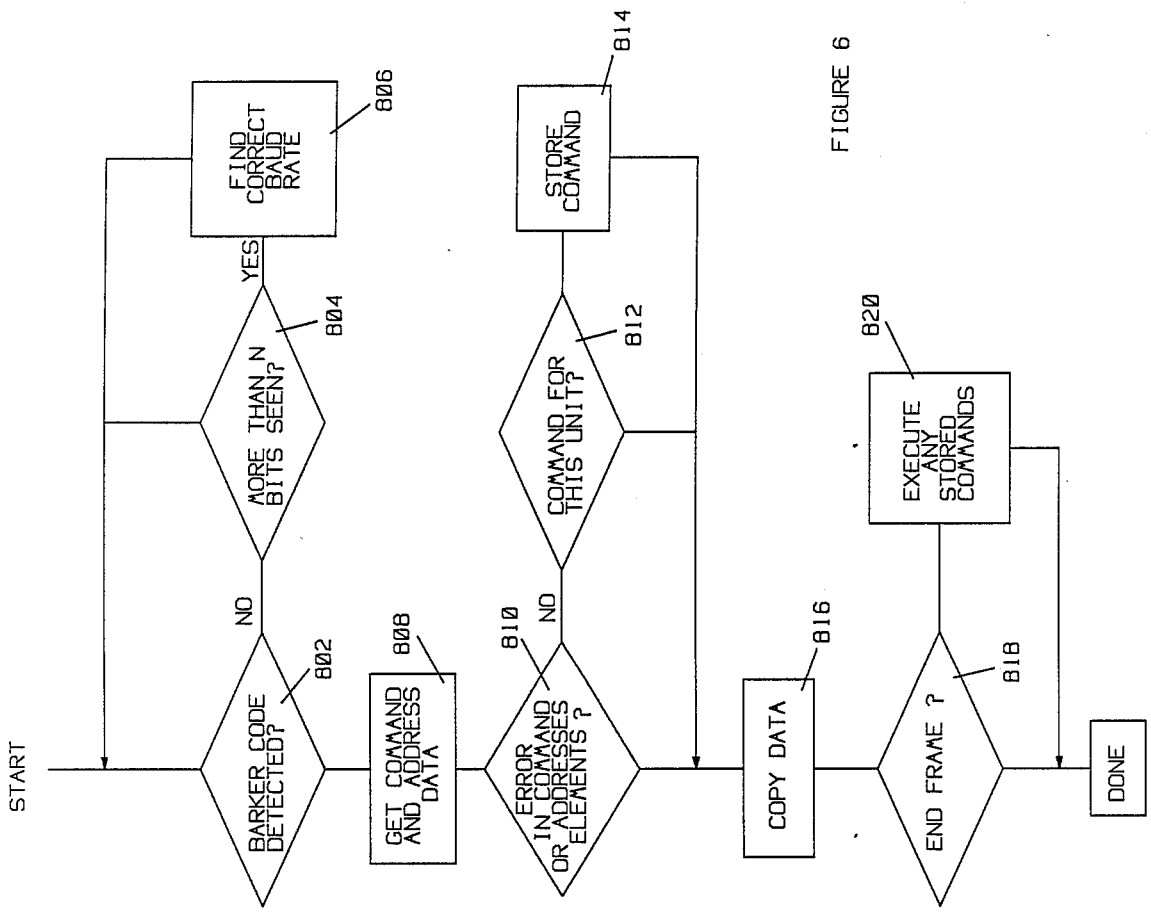

OFFICE CONTROL UNIT APPARATUS FOR USE IN A DIGITAL NETWORK

BACKGROUND OF THE INVENTION

1. Field of the Invention

The present invention relates to apparatus for use in digital networks of a type which connect a plurality of computers to form a computer network and more particularly to apparatus for transferring data between subscriber loops and a time-domain multiplexed communication link.

2. Description of Related Art

Many businesses have computer networks which extend over large geographic areas. The most economical manner for implementing such networks utilizes existing telephone lines to connect the various computers in the network. Computer networks that utilize the telephone system are known to the prior art. However, these computer networks are less than ideal. Problems arise from the use of transmission facilities which were designed for voice quality transmissions between two points and from the inclusion of components which are owned and maintained by separate commercial entities. However, because of the cost savings which are inherent in the use of the existing telephone system, it is desirable to adapt such network equipment for acceptable digital data transmission, if at all possible.

Existing computer networks suffer from a number of drawbacks. For example, prior art computer networks which utilize the telephone system are difficult to reconfigure either with regard to the speed at which data is transmitted within the telephone system or with regard to the topological configuration of the computer network. In prior art computer networks, telephone company technicians must be dispatched to various locations within the telephone system to effect a data rate change in the computer network. If the new rate is not one of a small number of rates for which the equipment is designed, the actual interface circuitry within the telephone system must often be changed. As a result, it is practically impossible to change data rates in response to short term changes in the quality of the telephone lines carrying the data.

Short-term increases in the noise on specific telephone lines are common. The telephone lines used for carrying the user's computer data are, in general, identical to the lines used to carry voice communications within the telephone system. These lines are bundled into cables with similar lines. The noise level on these lines depends upon a number of factors including the nature of the transmissions on lines bundled with those used for the computer network along routes which include a variety of telephone company switching equipment.

To change the network speed or configuration, changes must be made in equipment which is neither owned nor maintained by the computer network owner. This makes reconfiguration of the network difficult, since telephone company personnel must be coordinated with those of the network owner to effect a change.

Ideally, a network owner would like to be able to change the configuration of the network in response to observed error rates or the time of day. Such reconfiguration, for example, would be useful in smoothing peak loads on the computer network. Such reconfigurability would also be useful in transferring specific services to offices in earlier time zones when the office providing the service in another time zone closes at the end of the day. In prior art systems, such reconfiguration requires that key components of the computer network be rewired by telephone company personnel or that special purpose hardware be installed at significant cost.

Another example of a drawback in prior art computer networks is the inability of the user to monitor and manage the computer network. If a failure occurs in the computer network, it is difficult to ascertain whether the failure is the result of a malfunction in the equipment supplied by the telephone company, either on or off of the network owner's premises, or in the equipment owned and maintained by the network owner. Hence, when a malfunction is detected, telephone company technicians are often needed to ascertain the location of the failure within the system. The time delays in waiting for such determinations to be made are often unacceptable. It would be advantageous to provide a means for allowing the network user to set loopbacks and other diagnostic aids within the computer network without the time delays and added expense inherent when telephone company personnel must be involved. Similarly, the computer network user would like to be able to access data showing error rates on the various communication links in the computer network.

A typical multipoint network has a master computer and a plurality of slave computers. Each computer is connected to the telephone central office serving the geographic area in which the computer is located by subscriber loops which are, in general, identical to the communication lines used to connect a subscriber's telephone to the central office in question. Data is transferred between central offices with the aid of an apparatus, referred to hereinafter as an office control unit, which couples the subscriber loops in question to a time-domain multiplexed communication link used for transferring voice communications between central offices.

Prior art office control units do not provide the adaptive and control capabilities described above. In general, they allow the user to select one of a small number of data transmission speeds. To overcome the high error rates on the time-domain multiplexed communication links, office control units which utilize error correcting codes have been used. However, the error correcting codes utilized limit the maximum data transmission speeds in the computer network.

Broadly, it is an object of the present invention to provide an improved office control unit for use in computer networks utilizing the telephone system.

It is another object of the present invention to provide an office control unit which provides error correction without limiting the data rates on the time-domain multiplexed communication links.

It is yet another object of the present invention to provide an office control unit which monitors errors and provides information on the monitored error rates to the network user.

It is a still further object of the present invention to provide an office control unit which can perform loopback operations under the control of the network user.

These and other objects of the present invention will become apparent to those skilled in the art from the following detailed description of the invention and the accompanying drawings.

SUMMARY OF THE INVENTION

The present invention comprises an office control unit for transferring digital data between first and second subscriber loops and the time-domain multiplexed communication channels of a multipoint communication network which includes a plurality of network units with at least two of said network units comprising said office control unit. The network units are coupled to telephone system communication channels. Each said network unit comprises a means for transmitting and receiving digital data in a frame mode in which said data is organized into frames on said communication channels. Each said frame includes synchronization data, command data, error correcting data, and user data. Each said network unit further comprises a means for storing an address identifying said network unit, a means for receiving commands from other said network units in said computer network, said commands being specified by command data in a said frame received by said network unit, a means for generating command data in response to a received command included in said command data, a means for transmitting commands to other network units in said computer network, said transmitting means comprising means for inserting command data generated by said command data generating means into a said frame transmitted by said network unit, and a means for executing a said received command specifying said stored address as the target thereof.

The office control unit of the present invention further comprises a loop input port means for receiving a said frame on said first subscriber loop and a loop output port means for transmitting a said frame on said second subscriber loop. In addition, the office control unit also includes a time-domain multiplexed input port means for receiving data from a first incoming channel of said time-domain multiplexed communication channels, said time-domain multiplexed input port means including first decrypting means for receiving primary channel words on said first incoming channel and for generating a data word from each said primary channel word, each said data word comprising a portion of a said frame, said frame being constructed from successive said data words, said time-domain multiplexed input port means being coupled to said loop output port means, said generated data words being transmitted by said loop output port means. In addition, the office control unit also includes a time-domain multiplexed output port means for transmitting data on a first outgoing channel on said time-domain multiplexed communication channels, said time-domain multiplexed output port means including first encrypting means, coupled to said first loop input port means, for receiving a data word comprising a portion of a said frame and for generating a primary channel word therefrom, said primary channel word being transmitted on said first outgoing channel.

DETAILED DESCRIPTION OF THE INVENTION

Introduction

The office control unit of the present invention, hereinafter referred to as an adaptive office control unit, is best understood with reference to networks in which the apparatus attains many of its advantages. Hence, before proceeding with a detailed explanation of the office control unit of the present invention, a discussion of a simple computer network utilizing the office control unit will be given.

Figure 1:
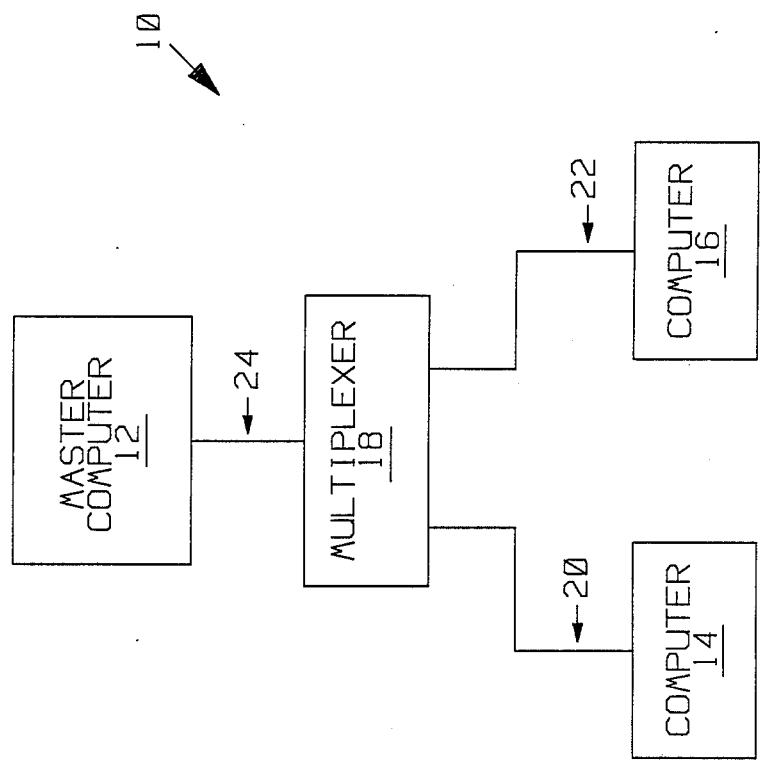
FIG. 1 is a block diagram of a simple computer network.

An example of a simple computer network 10 is shown in FIG. 1. Computer network 10 includes three computers 12, 14 and 16. Computer 12 is the master computer. Computers 14 and 16 are remote or slave computers which communicate with master computer 12 under the control of master computer 12.

A multiplexer 18 transmits each command from master computer 12 on a communication link 24 to both of the slave computers by copying each command input to it on communication link 24 onto branch communication links 20 and 22. Hence, each slave computer receives all commands transmitted by master computer 12. Each such command is addressed either to both of the slave computers or to a specified one of them. Each slave computer is programmed to respond only to those commands directed to it.

Multiplexer 18 combines the data streams sent by each of the slave computers 14 and 16 on communication links 20 and 22, respectively. The "combining" operation is typically an ORing of the data in each data stream. The combined data is then transmitted to master computer 12 on communication link 24. Hence, slave computers 14 and 16 must be programmed to respond to commands from master computer 12 one at a time. This is normally accomplished by using a polling protocol. Master computer 12 sends a command to one of the slave computers requesting information. The slave computer in question then responds. The other slave computer is programmed to be silent during this response.

Figure 2:
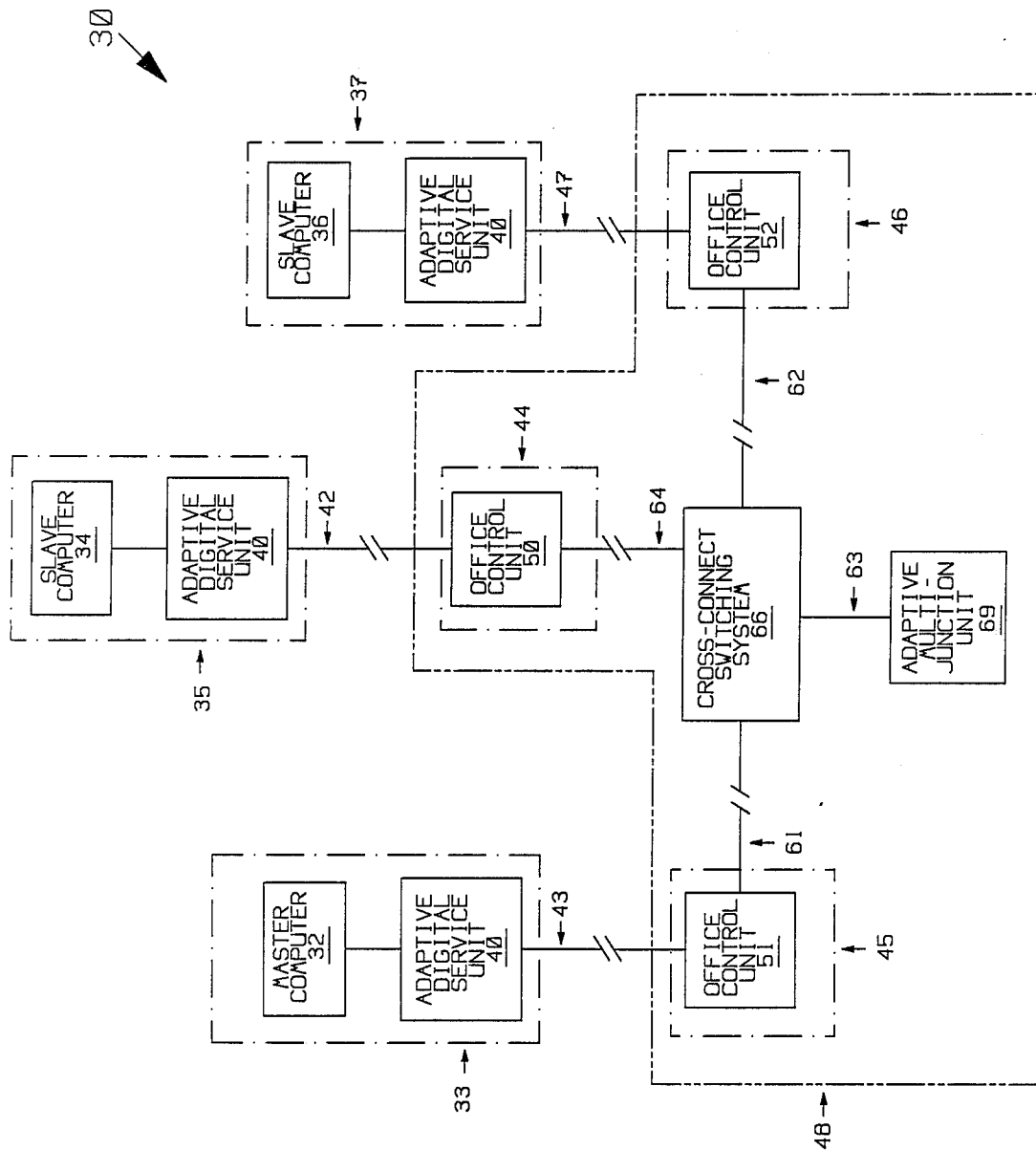
FIG. 2 is a block diagram of a telephone system based implementation of the computer network shown in FIG. 1, said implementation utilizing an office control unit according to the present invention.

A block diagram of a telephone system based implementation of computer network 10 is shown in FIG. 2 at 30. Computer network 30 includes a master computer 32 at location 33, a slave computer 34 at location 35, and a slave computer 36 at location 37. Each computer sends data to and from a first network unit referred to as an adaptive digital service unit 40 which is located on the same premises as the computer in question. Data is communicated between the adaptive digital service unit 40 and the computer connected thereto in a standard digital format such as RS-232.

The various adaptive digital service units of the network format the computer data for transmission to and from a telephone central office over a pair of conventional subscriber loops of the type used for normal voice communications. In computer network 30, master computer 32 communicates with central office 45 over the subscriber loops shown at 43. Similarly, slave computer 34 communicates with central office 44 over subscriber loops 42, and slave computer 36 communicates with central office 46 over subscriber loops 47. To clarify FIG. 2, the two subscriber loops in question are shown as a single communication path in the figure. However, it is to be understood that each such path comprises two subscriber loops, one for transmitting data in each direction relative to the central office. The central offices in question are all part of a telephone system 48.

Each pair of subscriber loops terminates on a second network which is an adaptive office control unit according to the present invention. In computer network 30, subscriber loops 42, 43, and 47, terminate on adaptive office control units 50, 51, and 52, respectively. The adaptive office control units reformat the data on the subscriber loops connected thereto to a format compatible with conventional $T_1$ communication links within telephone system 48. Exemplary $T_1$ communication links are indicated at 61-64.

Computer network 30 also includes an adaptive multijunction unit 69, which is a third type of network unit which performs functions analogous to multiplexer 18 shown in FIG. 1. The adaptive multijunction unit 69 copies the data input to it on specified channels of $T_1$ communication link 63 which are assigned to adaptive office control unit 51 to a set of channels on $T_1$ communication link 63 which are assigned to adaptive office control units 52 and 50. In addition, adaptive multijunction unit 69 ORs the data input to it on the $T_1$ channels assigned to adaptive office control units 50 and 52 and transmits the ORed data on the channels assigned to office control unit 51.

Telephone system 48 includes a cross-connect system 66 which is utilized for routing data between the $T_1$ channels of the various $T_1$ communication links. For example, cross-connect system 66 routes the data placed in preassigned channels of $T_1$ communication link 62 by office control unit 52 to the appropriate channels of $T_1$ communication link 63 where it is operated on by adaptive multijunction unit 69. Cross-connect system 66 is constructed from a number of cross-connect switches located at different geographical locations within telephone system 48; however, for simplicity, it is shown as a single block in the figure.

In addition to communicating data to and from the various computers in the computer network, the adaptive digital service units, adaptive office control units, and adaptive multijunction units communicate with each other to affect a number of useful network management functions. In one sense, a computer network utilizing the present invention comprises two computer networks. The first computer network consists of the user's computers, i.e., master computer 32 and slave computers 34 and 36 shown in FIG. 2. The second network consists of the adaptive digital service units, adaptive office control units, and adaptive multijunction units. The elements of this second network communicate with each other over the same telephone lines used by the computers in the first network. This second computer network will be referred to as the telephone system computer network in the following discussion.

Each of the elements in the telephone system computer network includes an onboard dedicated computer which will be referred to as a process and control circuit or microprocessor to distinguish it from the computers in the user's computer network. These process and control circuits send and receive instructions and data to each other on the same communication links used for transmitting data between the various computers in the computer network. These process and control circuits are also responsible for monitoring and, in some cases, taking actions which correct and/or reduce transmission errors within the telephone system computer network.

The communication links used in the present invention are designed for carrying voice quality data. Digital data of the type communicated in a computer network requires a much lower error rate than voice data. The error rates in question may depend on other data being transmitted on adjacent lines in the telephone system, and hence, can vary with the time of day and other environmental factors. The various network units, i.e., adaptive digital service units, adaptive office control units, and adaptive multijunction units, include circuitry for correcting some of the transmission errors. In addition, all of the process and control circuits are coupled to circuitry which monitors error rates on the communication links connected thereto and reports those error rates to other network units, upon request by said other units, which may then take action to reduce the error rates by sending commands to the various process and control circuits throughout the network.

A computer network utilizing the present invention provides superior error-related network management features which maximize the data throughput of the telephone system computer network while keeping error rates at acceptable levels. For example, the process and control circuits may be used to change the rate at which data is transmitted in the telephone system computer network. By adjusting the data rates, transmission errors resulting from noise are often significantly reduced.

In prior art systems, data transmission rates could only be changed by sending technicians to the various geographical areas within the telephone system. Furthermore, changing the data rates often required replacing the equipment within the system. Hence, the data rates could not be optimally adjusted in response to transitory conditions having a relatively limited time span. As a result, the data rates were often set at values significantly below the maximum data rates which could be sustained over the majority of the network operation hours. In a computer network utilizing the present invention in conjunction with the adaptive digital service units and adaptive multijunction units described herein, the data transmission rates may be automatically reduced when unsatisfactory error rates are observed and then automatically increased when the condition causing the high error rates subsides. Thus, the mean data transmission rate in the present invention is significantly higher than that obtained in prior art networks.

The manner in which the present invention operates requires a knowledge of the various data formats and communication protocols utilized in a computer network which employs the present invention. The computer network in question communicates in two data formats which will be referred to as the framed and unframed formats. The framed format which is utilized at transmission rates below 64 Kbits/sec will be described first.

Figure 3:
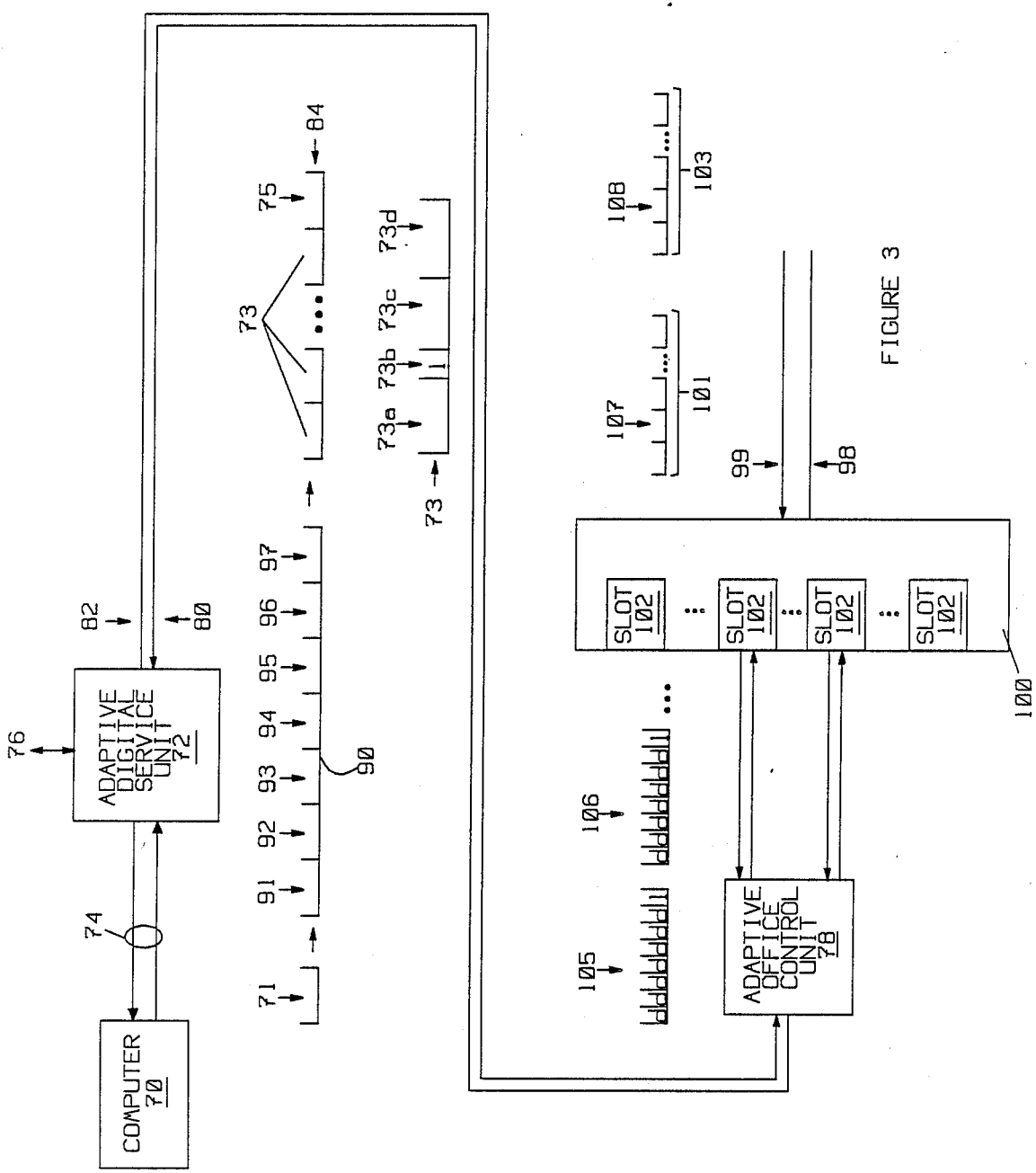
FIG. 3 illustrates the formatting of data transferred between a user's computing equipment and telephone company $T_1$ communication links.

FIG. 3 illustrates an interface between the user's computing equipment and a $T_1$ communication link via two subscriber loops. A user's computer 70 communicates with an adaptive digital service unit 72 over a serial communication line 74 which links other computers in the user's computer network through the telephone system. The user may also communicate with the various elements of the telephone system computer network through a command port 76 in adaptive digital service unit 72. Adaptive digital service unit 72 communicates with an adaptive office control unit 78 over two subscriber loops 80 and 82. Subscriber loop 82 is used to send data to adaptive office control unit 78, and subscriber loop 80 is used to receive data from the adaptive office control unit. Communications on subscriber loops 80 and 82 are in a synchronous protocol which utilizes a clock in the telephone system for timing. When computer 70 communicates with adaptive digital service unit 72 in a synchronous protocol, it also uses this clock.

Data is communicated between computer 70 and adaptive digital service unit 72 in bytes, e.g., 8-bit words. A typical data byte is shown at 71. Adaptive digital service unit 72 accumulates a number of data bytes from computer 70 before transmitting the data to adaptive office control unit 78 on subscriber loop 82. The data may be transferred in either the framed or unframed modes, with the latter allowing a higher data transmission rate.

When utilizing the framed mode, the data communicated between adaptive digital service unit 72 and adaptive office control unit 78 is preferably formatted in 560-bit packets which will be referred to as frames. Each frame includes user data plus additional "overhead" or "system" data used by the process and control circuits of the present invention. This additional data includes synchronization data, command data, and error correcting data. A typical frame 84 is constructed from 17 32-bit elements 73 and a 16-bit block 75. Each element 73 contains four fields. The first field 73a consists of 16 data bits. The second field 73b consists of a "1" used to maintain synchrony within the telephone system. The third field 73c consists of 10 more data bits and the fourth field 73d consists of 5 bits used for detecting and correcting transmission errors. The 5 bits in question will be referred to as either as an ECC word or ECC/CRC bits for reasons which will be discussed in detail below.

Each frame is created from a loop interface data frame which is also produced within adaptive digital service unit 72. The loop interface frame is shown at 90 in FIG. 3. Loop interface frame 90 consists of 7 fields. The first field 91 consists of a 16-bit synchronization word which is used to achieve and maintain system synchronization. This field is preferably equal to 1FD0 in hexadecimal and referred to as the Barker synchronization code.

The second field 92 consists of a 16-bit command word which is used to signal the various process and control circuits in the telephone system computer network. The functions specified by this command word will be discussed in detail below. The third field 93 consists of a 16-bit address word identifying the device in the telephone system computer network to which the command in field 92 is directed.

The fourth field 94 consists of an 8-bit rate word which is used to communicate user data in an asynchronous transmission mode.

The fifth field 95 is a 2-bit signal word. One of these bits is used for security purposes, and the other specifies the number of user data bits that are actually being communicated in the frame.

The sixth field 96 contains the bulk of the user data, i.e., the data being communicated between the computers of the user's computer network. This field contains 384 bits.

Finally, the seventh field 97 contains a 16-bit word used to implement a secondary low speed communication channel referred to as a reverse channel below. The reverse channel allows a request to be sent to the master computer from one of the slave computers while the master computer is communicating with a different slave computer.

Adaptive digital service unit 72 accumulates data bytes 71 from computer 70 in a FIFO buffer. Data is read from this buffer to create frame 84. The number of bits read from this buffer depends on the speed at which the network is running and on whether the computer network is running in a synchronous or asynchronous mode.

Adaptive digital service unit 72 also stores any commands input thereto on command port 76 until adaptive digital service unit 72 is ready to send the next frame 84 on subscriber loop 82. The time at which frames 84 are sent on subscriber loop 82 is determined by clock signals communicated to adaptive digital service unit 72 on subscriber loop 80.

The loop interface frame 90 is converted to frame 84 by the bitwise copying of successive data bits from loop frame 90 into the data bit fields of the elements of frame 84. The first element of frame 84 contains the 16 bits of the first field 91 of loop frame 90, followed by a "1", followed by the first 10 bits of the second field 92, followed by 5 ECC/CRC bits which are generated from the 26 bits of the first two elements using a conventional error correcting code. The added "1" guarantees that there is a sufficient density of one bits on the subscriber loops to maintain synchrony between the adaptive digital service unit and the adaptive office control unit connected thereto.

The second element of frame 84 contains the last 6 bits of command field 92 plus 10 bits of address field 93, followed by a "1", followed by the last 6 bits of field 93 plus the first 4 bits of rate field 94, followed by the 5 ECC/CRC bits for the second element. Successive elements of frame 84 are generated in a like manner.

Frame 84 then ends with an eighteenth element comprising the 16 bits of field 97. No ECC/CRC bits are calculated for this last 16-bit field.

Frame 84 is transmitted by the adaptive digital service unit 72 to adaptive office control unit 78 on subscriber loop 82. The speed at which data is sent on subscriber loops 80 and 82, referred to as the loop speed, depends on the data rate between computer 70 and adaptive digital service unit 72 as well as the communication protocol being used, i.e., framed or unframed. The relationship between the loop speed and the data rate in the preferred embodiment of the present invention is shown in Table I.

The loop speed, i.e., the speed of data transmission over the subscriber loops, is higher than the data rate at which the customer's digital processing equipment transmits data to the adaptive digital service unit, because of the additional data added to the customer's data. The preferred network provides data transmission at data rates typically ranging between 1.2 and 64 Kbits/sec. For example, the data rates provided in a practical embodiment include 1.2, 2.4, 4.8, 9.6, 19.2, 32, and 38.4 Kbits/sec in the framed mode. A data rate of 64 Kbits/sec is supported in the unframed mode described below.

As noted above, the number of user data bits inserted into frame 84 by adaptive digital service unit 72 depends on the data rate and on whether the adaptive digital service unit is running in a synchronous or asynchronous mode. The number of user data bits so inserted in the synchronous mode is also shown in Table I. The asynchronous data mode will be discussed in more detail below. At those data rates for which fewer than 384 bits are accumulated, the remaining bits of field 96 are loaded with ones. At a data rate of 1.2 Kbits/sec, the remaining 192 bits may be loaded with a copy of the 192 bits accumulated from computer 70 instead of ones. This second copy of the user's data provides additional error correcting capability.

Adaptive office control unit 78 transforms frame 84 into a format which is compatible with a $T_1$ communication link within the telephone system. The $T_1$ communication links in the telephone system consist of two communication paths. The first path 98 is used to transmit data and the second path 99 is used to receive data. Data is transmitted on these paths in 24 time-domain multiplexed channels. Each channel operates at a fixed rate of 64 Kbits/sec. The data is communicated in 24-byte $T_1$ frames, one byte of each frame corresponding to each time-domain multiplexed channel. Typical frames are shown in FIG. 3 at 101 and 103.

The interface between the individual channels and the $T_1$ communication links is accomplished by a conventional channel bank 100 which includes 24 "slots" 102. Each slot provides a means for sending data to and receiving data from a specified $T_1$ channel. In the preferred embodiment of a computer network utilizing the present invention, two of these slots are used by each adaptive office control unit for transmitting frame 84. However, as will be explained in detail below, if a user wishes to purchase only a subset of the error correcting features of the telephone system computer network, only one of these slots is made available. To simplify the following discussion, it will be assumed that only one of these channels is utilized unless otherwise specified.

At a loop speed of 56 Kbits/sec, adaptive office control unit 78 copies frame 84 into the first of these reserved $T_1$ channels by copying successive 7-bit segments of said frame on the $T_1$ channel during the time period reserved for the $T_1$ channel in question. Each 7-bit segment is augmented by adding one "1" bit to form an 8-bit byte. This byte is then copied to the $T_1$ channel. Two successive bytes created by adaptive office control unit 78 are shown at 105 and 106 respectively. The "d" indicates a data bit and the "1" indicates the inserted one bit. Bytes 105 and 106 are copied to the $T_1$ channels shown at 107 and 108 respectively.

The added one bit assures that there is sufficient density of ones on the $T_1$ communication link to maintain the synchronization of the $T_1$ system. $T_1$ communication links are used to transmit data over long distances. Hence, they must utilize one or more repeaters. These repeaters must be synchronized to assure the overall synchrony of the $T_1$ system. The repeaters in question utilize transitions between "1" and "0" bits to maintain synchrony. As a result, a long sequences of "0" bits are to be avoided. By adding one "1" per byte, each office control unit assures that the minimum density of "1" bits is always present. As noted above, the data rate of a $T_1$ channel is 64 Kbits/sec. The added "1" bit transmitted with each 7 bits of frame data brings the 56 Kbits/sec loop speed up to 64 Kbits/sec, which exactly matches the capacity of a $T_1$ channel.

When the loop speed is less than 56 Kbits/sec, i.e., 28 Kbits/sec, 14 Kbits/sec, 7 Kbits/sec or 3.5 Kbits/sec, the $T_1$ channel is capable of transmitting more data than the telephone system computer network is receiving. In a computer network utilizing the present invention, this added capacity may be used for error correction by repetitively transmitting each data byte. The additional copies of the byte are transmitted in successive $T_1$ frames immediately after the $T_1$ frame containing the first copy. When the loop speed is 14 Kbits/sec, each byte is transmitted four times in successive $T_1$ frames, and so on.

Adaptive office control unit 78 also receives data from the $T_1$ channel connected thereto on line 99. When two copies of the transmitted byte are received by an adaptive office control unit 78, the unit checks for errors by noting disagreement between the two bytes, and one of the bytes is selected for output. If the number of copies of each byte is greater than two, an adaptive office control unit 84 receiving the data on the $T_1$ channel can correct for some errors that occur on a channel level, i.e., during transmission of the bytes between network units which communicate on the $T_1$ communication links. Such network units utilize conventional majority decision algorithms in addition to detecting and reporting errors. If only two copies of the transmitted bytes are present, and the copies are not identical, the receiving adaptive office control unit 78 only notes an error. As will be explained below, such error information may be accessed from the adaptive digital service units to aid in diagnosing system failures and taking corrective measures.

When "$T_1$ formatted" data bytes are received in an adaptive office control unit, the added "1" bit is stripped and the original frame is reconstructed. This frame is transmitted to adaptive digital service unit 72 on subscriber loop 80. Those errors that can be corrected using the above mentioned majority decision algorithm are corrected; however, no attempt is made to correct errors in user data utilizing the 5 error correcting bits included in each element 73. Rather, errors that can be so corrected are corrected by adaptive digital service unit 72 when it receives the frame.

Upon receiving a frame, adaptive digital service unit 72 unpacks the frame elements 73 and corrects for any errors which can be corrected using the 5 error correcting bits. Adaptive digital service unit 72 then separates the user data from the command data. The user data is transmitted to computer 70 on serial communication link 74. Any commands intended for adaptive digital service unit 72 are executed by adaptive digital service unit 72.

The adaptive digital service unit which is connected to the master computer in the user's computer network will be referred to herein as the master adaptive digital service unit. The adaptive digital service units connected to the slave computers in the user's computer network will be referred to as the slave adaptive digital service units. If a slave adaptive digital service unit notes errors, it keeps track of these errors. If the error rate exceeds a predetermined threshold value, the slave adaptive digital service unit in question reports an error condition to the master adaptive digital service unit using one of the commands transmitted in field 92 of the loop frame.

If the adaptive digital service unit is a master adaptive digital service unit, it may send commands to the process and control circuits in the telephone system computer network which cause the speed of the computer network to be reduced. These commands are also sent in field 92. By reducing the speed of the telephone system computer network, error rates may be significantly reduced for two reasons. First, reducing the speed at which subscriber loops 80 and 82 operate substantially reduces the error rates on these communication links. Second, as noted above, majority decision algorithms can be used to correct $T_1$ channel-level errors on the $T_1$ communication links at lower data rates.

As noted above, the present invention also supports a communication mode in which user data is transmitted at 64 Kbits/sec. Such high speed data transfer capabilities are increasingly sought in order to implement high speed computer networks. Since the effective bandwidth of subscriber loops 80 and 82 does not permit data transfer at rates greater than 72 Kbits/sec, there is insufficient bandwidth to permit data transfer using the loop frame format described above. As a result, error checking and correction on the subscriber loop links is not available in this communication mode. Error detection and correction may be, however, provided on the data paths utilizing $T_1$ communication links.

When operating in the unframed format, 64 Kbits/sec communication mode, adaptive digital service unit 72 receives 8-bit data bytes from computer 70 and transmits data in 9-bit words on subscriber loop 82. Each 9-bit word consists of the 8 bits transmitted by computer 70 and a "1". The added "1" is utilized to maintain synchrony on subscriber loops 80 and 82. Upon receipt by adaptive office control unit 78, the added "1" is stripped, and the 8-bit data byte is then preferably transmitted using an error correcting code to correct for transmission errors on the $T_1$ communication links.

As noted above, the $T_1$ communication links were originally designed for carrying voice quality data. As a result, the transmission error rates over these communication links is often too great to allow satisfactory transmission of computer data. To reduce the effective error rates on the $T_1$ communication links, both of the $T_1$ channels mentioned above are utilized together with an error correcting code. At lower transmission speeds, such error correction is not so critical, since the insertion of error codes and error correction utilizing these codes are performed by the adaptive digital service units. However, additional error correction may still be desirable. At the 64 Kbits/sec data rate, these adaptive digital service unit functions are not available; hence, this added error correction is almost always needed.

Conventional error correcting codes are well known in the computer and telephone arts. Hence, these codes will not be discussed in detail here. For the purposes of this discussion, an error correcting code will be defined as a transformation of a D-bit data word to an encrypted Q-bit data word where $Q > D$ and wherein the transformation which decrypts the Q-bit encrypted data word corrects for errors resulting from alterations due to as many as N bits being picked up or dropped in transmission over the $T_1$ communication links. Here, N is a function of the particular code chosen. In general, codes having higher ratios of Q to D have higher N values.

In the present invention, D is preferably equal to 8; hence, Q must be greater than 8. As noted above, a single $T_1$ channel provides a 64 Kbits/sec data communication facility. Since the user data is arriving at adaptive office control unit 78 at 64 Kbits/sec in the unframed mode, and since more than 8 bits must be sent for each 8 bits received, it follows that more than one $T_1$ channel must be utilized. As noted above, each adaptive office control unit 78 is connected to two slots in the $T_1$ channel bank. The above discussion assumed that only one of these slots is utilized. When additional error correction on the $T_1$ communication links is desired, e.g., at the 64 Kbits/sec data rate, both slots are utilized. Since two $T_1$ channels are utilized, the optimum value for Q is 16. Hence, the present invention utilizes a 16-bit error correcting code. That is, each 8-bit user data word is encrypted to form a 16-bit encrypted word which is then divided into two 8-bit transmission words, one such transmission word being transmitted over each of the two $T_1$ channels coupled to adaptive office control unit 78.

Similarly, adaptive office control unit 78 receives two data words from the incoming channels of the channel bank and converts those two words to a 16-bit encrypted word which is then decrypted to form an 8-bit data word which is used to generate the data transmitted on subscriber loop 80. If the computer network is operating in the framed mode, the added one is stripped from the 8-bit data word. If the computer network is operating in the unframed mode, a "1" is added.

In addition to the properties mentioned above, the error correcting code used for correcting errors on the $T_1$ communication links preferably includes one additional property. As noted above, the $T_1$ communication links include repeaters which enable the signals thereon to be transmitted over long distances These repeaters must remain synchronized. The synchronization is accomplished by observing transitions between "1" and "0" bits on the communication links. Hence, a minimum density of "1" bits is needed. At lower transmission rates, this density was provided by sending 7 data bits and a "1" in each $T_1$ channel. At 64 Kbits/sec, this solution is not possible, since there is insufficient bandwidth on the $T_1$ lines to transmit the additional "1". As a result, the preferred error correcting code is one which guarantees that each of the 8-bit transmission words has at least one "1".

Computer networks utilizing $T_1$ communication links are known to the prior art. However, the data rates attained in such computer networks are significantly less than those attained in a computer network utilizing the present invention. In prior art computer networks, the office control units utilized therein added a "1" bit to each 7 bits of user data in a manner similar to that described above with reference to the framed mode of the present invention. This added one provided the needed density of ones on the $T_1$ communication links; however, it limited the data transmission speeds, as measured by bits of user data transmitted per sec, to 56 Kbits/sec even using two $T_1$ communication link channels. The present invention provides a data rate of 64 Kbits/sec on the same two channels.

The preferred error correcting code used in the adaptive office control unit differs from conventional error correcting codes which do not provide at least one "1" in each 8-bit transmission word. In conventional error correcting codes, at least one of the transmission words is 0 for some value of the 8-bit user data word. As a result, conventional error correcting codes are unsatisfactory for use in the 64 Kbits/sec mode of a computer network according to the present invention.

The preferred error correcting code is, however, derived from a conventional error correcting code by a transformation which is easily implemented in electronic circuitry and which preserves the full error correcting capability of the conventional error correcting code.

When the $T_1$ error correcting features is operative, an 8-bit data word which is to be sent over a $T_1$ communication link is encrypted as follows. First, the 8-bit user data word is encrypted with a conventional cyclic error correcting code shown Table II to form two encrypted 8-bit words $^1X$ and $^2X$. The error correcting code shown in Table II is a conventional (16, 8) BCH code in which the 16-bit encrypted data word has been broken into two 8-bit data words.

The adaptive office control unit transmits two transmission data words $^1Y$ and $^2Y$ in place of $^1X$ and $^2X$. $^1Y$ and $^2Y$ are derived from $^1X$ and $^2X$ by performing a transformation of $^1X$ and $^2X$ to arrive at $^1Y$ and $^2Y$. The transformation in question operates by exchanging the data in various bit positions and by complementing the data in specified bit positions prior to said data being exchanged. This is illustrated in Table II by the labels over the various bit positions in $^1X$, $^2X$, $^1Y$, and $^2Y$. The bit positions in $^1X$ are labeled "1" through "8". The bit positions in $^2X$ are labeled "A" through "H". The data used to generate $^1Y$ and $^2Y$ is shown over the columns labeled $^1Y$ and $^2Y$. For example, the first bit of $^1Y$ is obtained by copying the data in the first bit position of $^1X$. The second bit of $^1Y$ is obtained by copying the data in the second bit position of $^1X$. And, the eighth bit of $^1Y$ is obtained by copying the data in the seventh bit position of $^2X$ and complementing said data, as indicated by the bar over the letter G.

This method for generating the transmission words, $^1Y$ and $^2Y$, is preferred because conventional circuitry for generating $^1X$ and $^2X$ from a user data word x using a BCH code is inexpensive and readily available. The above described transformation is also easily implemented since it can be carried out by placing $^1X$ and $^2X$ in a first set of registers and then copying the data to a second set of registers by connecting the corresponding bit positions by conducting paths. For those bit positions in which the data is to be complemented, inverters are placed in the conducting paths in questions.

Similarly, the decryption process may advantageously utilize conventional circuitry for decrypting the BCH code in question. The transmission data words are placed in a first set of registers. The data in these registers in then copied into a second set of registers by connecting corresponding bit positions by conducting paths which include inverters in selected paths. The data in the second set of registers is then decrypted using the conventional BCH hardware.

It should be noted that the transformation in question begins and ends with the conventional BCH code. Hence, it has the same error detecting and correcting capabilities as the conventional code.

Having provided the above discussion of the basic elements of a computer network adapted for utilizing an adaptive office control unit according to the present invention, a more detailed description of such an adaptive office control unit will now be given.

Figure 4:
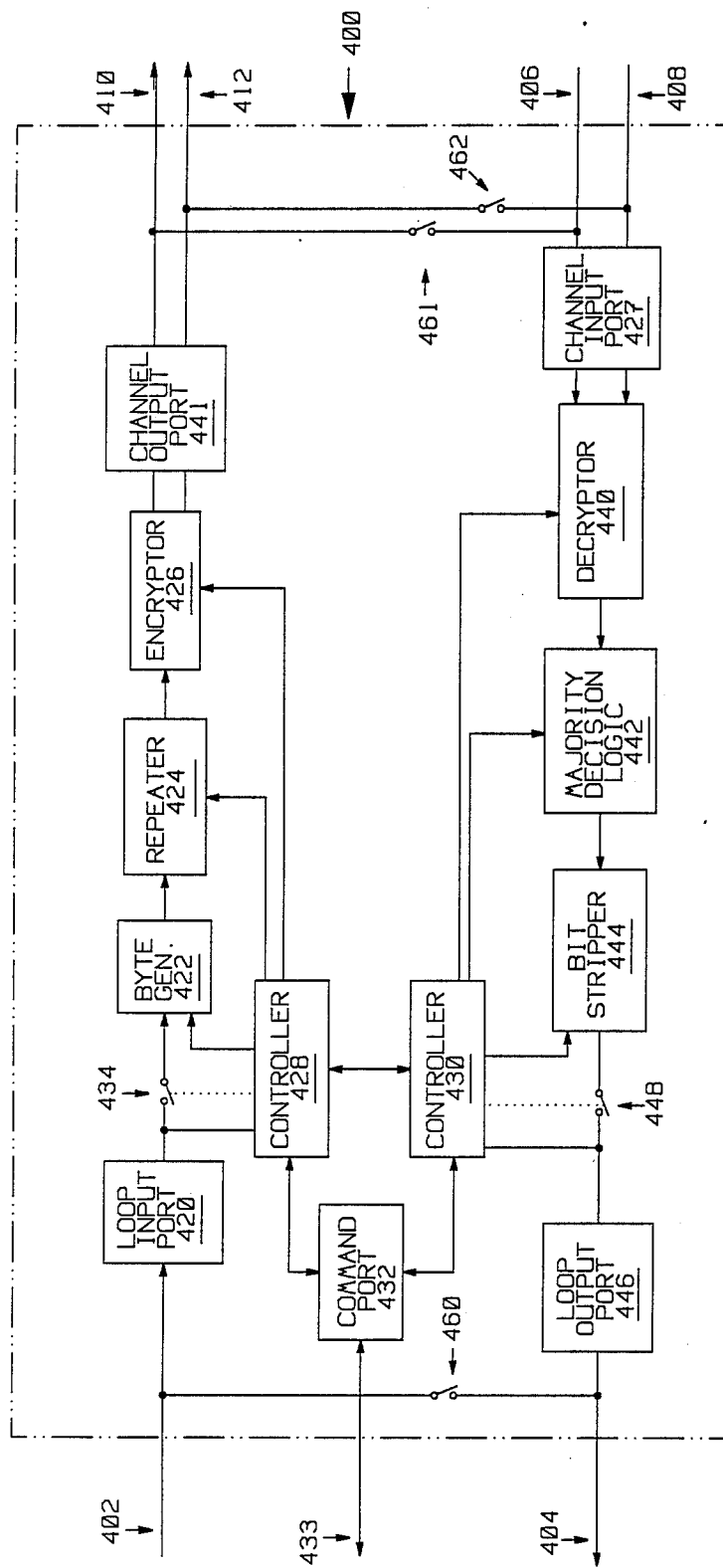
FIG. 4 is a block diagram of an adaptive office control unit according to the present invention.

FIG. 4 is a block diagram of an adaptive office control unit 400 according to the present invention. Adaptive office control unit 400 is connected to two subscriber loops. Subscriber loop 402 is used to received data from an adaptive digital service unit, and subscriber loop 404 is used send data to the adaptive digital service unit in question. Adaptive office control unit 400 also connects to two slots in a channel bank which has been omitted from the figure to simplify the figure. Each slot is connected via two communication links. Data is received from the channel bank on communication links 406 and 408. Data is sent to the channel bank on communication links 410 and 412. If the error correcting code described above is not in use, only communication links 406 and 410 are actually utilized. Since communication links 408 and 412 are utilized solely for implementing the above described error correcting code, the $T_1$ channel to which said communication links are connected will be referred to as the error correcting channel.

To simplify the following discussion, the operation of adaptive office control unit 400 will first be described for the case in which the error correcting channel is not in operation and in which the computer network in question is operating in the framed data mode. In this case, each frame transmitted on subscriber loop 402 is received by a subscriber loop input port 420 which provides the proper impedance matching function for subscriber loop 402. The each 7-bit segment is augmented by adding an 8-th bit which is a one by a byte generator 422. Each byte so generated is input to a repeater 424 which repeats the byte in question a predetermined number of times dependent upon the data rate at which the computer network is operating. Each byte output by repeater 424 is sent over communication link 410 by an encryption circuit 426 via a channel output port 441 which provides the appropriate line driving functions. Since it is assumed that the error correcting channel is not operating in this discussion, encryption circuit 426 merely copies the bits of the byte in question to communication link 410.

The above operations are under the control of a controller 428 which is preferably a microprocessor. In addition to these control functions, controller 428 monitors the incoming frame and extracts the command and address data therefrom. If these data contain a command which is directed to adaptive office control unit 400, controller 428 stores the command for execution after the entire frame has been received. In addition, controller 428 is connected to a second controller 430 and a command port 432 which may also communicate commands that are to be executed by controller 428. Command port 432 may be accessed by telephone technicians by connecting a control computer to bus 433. The other functions carried out by controller 430 will be discussed in more detail below.

If a command which is to be executed by controller 428 requires that said controller place data into a frame which is being received by subscriber loop input port 420, switch 434 may be used to interrupt said frame to allow controller 428 to substitute the new data for the existing data in the frame.

Similarly, a frame which is received from a $T_1$ communication link via the channel bank on communication link 406 is received by decryption circuit 440 via a channel input port 427 which provides the appropriate impedance matching for lines 406 and 408. Since it is being assumed that the error correcting channel is not functioning in this discussion, decryption circuit 440 copies each incoming byte on 406 to a majority decision circuit 442. As noted above, each byte transmitted and received on a $T_1$ communication link is repeated a predetermined of times. If the number of repeats is greater than two, majority decision circuit 442 uses a conventional majority decision algorithm to correct for transmission errors. If the number of repeats is equal to two and the two copies disagree, an error is noted and one of the two copies is chosen to be outputted. If only one copy is present, majority decision circuit 442 merely copies the incoming byte to its output.

The bytes leaving majority decision circuit 442 consist of a 7-bit segment of a frame and an added one. Bit stripper 444 removes the added one. The 7-bit segment is then outputted to subscriber loop 404 by subscriber loop output port 446 which preferably includes a FIFO buffer for adjusting the timing of the bits of the frames leaving said output port.

The frames leaving bit stripper 444 are monitored by controller 430 which also controls the functions of majority decision circuit 442 and decryption circuit 440. Controller 430 extracts the command and address data from each frame monitored thereby. If these data specify a command to be executed by adaptive office control unit 400, controller 430 stores the command until the frame in question has finished. Controller 430 then executes the command in question.

Controller 430 may also be used to insert data into a frame which is to be transmitted by subscriber loop output port 446. Such data is usually inserted in response to a command received by controller 428 or a command which has been entered through command port 432. When data is to be so inserted, switch 448 may be used to interrupt the data flow so as to allow controller 430 to insert the data in question.

As noted above, adaptive office control unit 400 also monitors the frames passing therethrough for transmission errors. The 5 ECC/CRC bits in each element 73 of the frames in question are utilized for this purpose. When an error is so detected, the controllers note the error, but do not attempt to correct it using the 5 ECC/CRC bits. In addition, as will be explained in detail below, the controllers examine these error bits before executing a command. If the ECC/CRC bits in the frame elements 73 containing either the command or address data indicate that a transmission error has occurred, the command is ignored.

The above discussion assumed that the error correcting channel was not functioning. If the error correcting channel had been enabled, the functioning of adaptive office control unit 400 would have been exactly the same as described above with the following exceptions. When the error correcting channel is enabled, each byte input to encryption circuit 426 is encrypted to form two encrypted channel words utilizing the above described error correcting code. One such word is transmitted on communication link 410, and the other is transmitted on communication link 412.

Similarly, when the error correcting channel is enabled, two encrypted channel words are received by decryption circuit 440. One word is received on communication link 406, and the other is received on communication link 408. These two received channel words are decrypted using the above described error correction code to form a single error corrected byte which is output to majority decision circuit 442. The remaining functions of adaptive office control unit 400 are unchanged by the enablement of the error correcting channel.

The above discussion has also assumed that the computer network in which adaptive office control unit 400 is operating is running in the framed data mode. If the computer network were operating in the 64 Kbits/sec unframed mode, the following differences in operation would occur. First, byte generator 422 would receive an 8-bit byte from subscriber loop input port 420 and would be inhibited from adding the one which it adds in the framed data mode. Similarly, bit stripper 444 would be inhibited from removing the 8th bit of each byte received from majority decision circuit 442. Third, repeater 424 would be inhibited from repeating each byte input thereto, and majority decision circuit 442 would function as if only one copy of each byte were present on the $T_1$ communication link. Finally, controllers 428 and 430 would monitor the data bytes passing thereby for the predetermined sequence of bytes which is used to signal the end of the unframed data mode. When this sequence is found, adaptive office control unit 400 returns to the framed data mode at a predetermined default data rate.

As will be explained in more detail below, an adaptive office control unit according to the present invention includes circuitry for providing loopbacks which are used for diagnostic purposes. Switches 460-462 are used to make the connections needed to implement these loopbacks. These switches are under the control of controllers 428 and 430. To simplify the figure, the control connections to these switches have been omitted from the drawing.

Figure 5A:
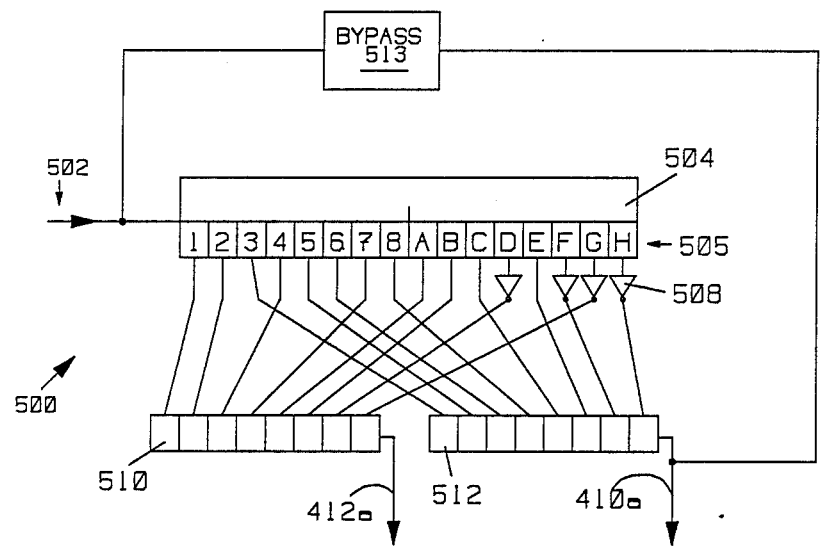
FIG. 5a and 5b are flow charts of the command execution cycle of a controller utilized in the present invention.

A block diagram of the preferred embodiment of error code encryption circuit 426 according to the present invention is shown in FIG. 5(a) at 500. The error correcting code used by this circuit is given in Table II.

A data byte received from repeater 424 on line 502 is loaded into cyclic code generating circuit 504 which converts each 8-bit data word into a 16-bit encrypted word which is stored in a 16-bit register 505. The individual bits of register 505 are labeled 1 through 8 and A through H. These two 8-bit data words correspond to $^1X$ and $^2X$ shown in Table II. The 16-bit encrypted word stored in register 505 is transformed into two transmission words by connecting each bit in register 505 to a corresponding bit in one of two shift registers 510 and 512. These two transmission words correspond to $^1Y$ and $^2Y$ shown in Table II. Those bit positions in register 505 that are to be complemented are connected to the corresponding bit positions in the shift registers through inverters of which inverter 508 is typical. These connections form a hardwired transformation of the conventional error correcting code to an error correcting code according to the present invention. The transformed error correcting code is then shifted out onto lines 410a and 412a. When the error correcting channel is not operative, a bypass circuit 513 copies the data input on line 502 to line 410a.

Figure 5B:
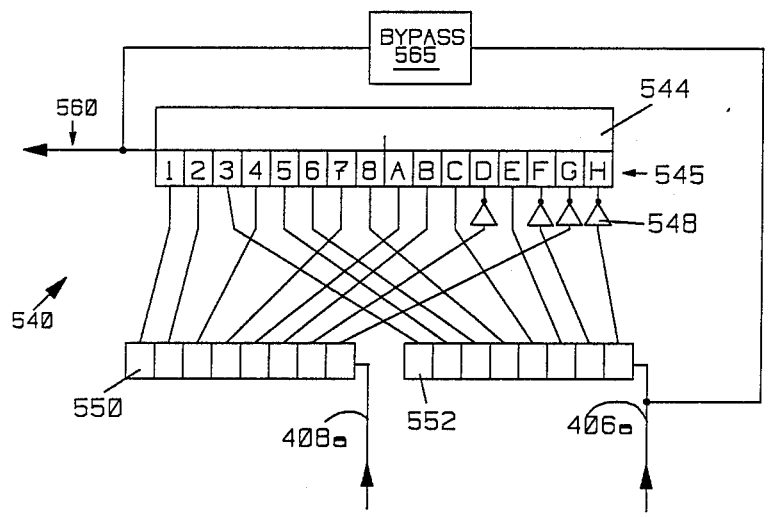

A block diagram of the preferred embodiment of decryptor 440 is shown in FIG. 5(b) at 540. The two encrypted bytes received on lines 406a and 408a are loaded into registers 550 and 552. The data in these registers is transferred to a 16-bit register 545 in a cyclic code decoding circuit 544. The data in question is transferred by connecting the individual bits of shift registers 550 and 552 to register 545 such that the inverse of the transformation between register 505 and shift registers 510 and 512 is performed. Once loaded, the contents of register 545 are decoded using the conventional cyclic code decoding circuitry. The resulting 8-bit data word is then outputted to majority decision logic circuit 442 on line 560. When the error correcting channel is not operating, a bypass circuit 565 copies the data input on line 406a to line 560.

The various commands executed by an adaptive office control unit and their functions will now be described.

Secure Commands

The present invention provides a security mechanism to insure that network commands originating from an adaptive digital service unit are restricted such that a user cannot use an option that is not subscribed or change the network configuration in a manner that might introduce problems into the telephone system. The mechanism in question utilizes the first bit in field 95, which is referred to as the security bit. When this bit is a "1", the adaptive office control units and adaptive multijunction units are restricted from executing the commands specified in field 92 of the loop frame. To assure that a user cannot set the security bit to a "0", each adaptive office control unit forces this bit to a "1" when the adaptive digital service unit blocked data is passed through the adaptive office control unit. Switch 434 shown in FIG. 4 is utilized to make this insertion into the frames inputted to the adaptive office control unit from subscriber loop 402. Secure commands, i.e., those which require a security bit of "0", can only be sent from internal devices (adaptive office control units and adaptive multijunction units) in the telephone system computer network. Whenever an internal device receives a command from its system control port, the device sets the security bit to "0" for the frame containing the command in question.

If an adaptive digital service unit inserts a secure command into a loop frame in response to commands on its system control port, the internal devices in the telephone system computer network will not execute the command, since even if the adaptive digital service unit changes the security bit to a "0", the adaptive office control unit receiving the loop frame information forces the security bit to a "1". However, an adaptive digital service unit receiving a secure command will execute the command, since adaptive digital service units do not check the security bit. Hence, the user can always check the observed data rates through the entire system, since this information is available from the far end adaptive digital service unit.

Examples of secure commands are commands that reset the internal devices in the telephone system, commands that enable the 64 Kbits/sec transmission mode, commands that enable the error correcting channel, and commands that enable a second group of commands that are referred to as conditionally secure commands. If a user wishes to utilize the conditionally secure commands, the user must do so by transmitting the request to the telephone company. A telephone system technician then issues a secure command that enables the commands in question.

Conditionally secure commands are commands that may be enabled for a given network by the telephone company. Once enabled, the user can use these commands. Such commands are useful for restricting service to computer networks that have subscribed to only part of the available computer network services. Examples of such commands are commands that read the status of various internal devices, e.g., adaptive office control units and adaptive multijunction units, and commands that place the various internal devices in loopback modes for testing.

Conditionally secure commands are implemented utilizing the above discussed security bit and a security flag in each network unit. Each network unit has a security flag consisting of a one-bit storage cell. There is one such flag for each feature that may be triggered by a conditionally secure command. If a network unit's security flag for a particular option is set to a "1", the network unit will ignore a conditionally secure command sent to it. If the security flag is a "0", the command will be executed. The security flags of the various network units are set and reset by a set of secure commands. Hence, when a user subscribes to a particular service such as user enabled testing, a secure command enabling the security flag in the relevant internal devices is sent by a telephone company technician.

Rules Governing the Execution of Network Commands

The various network units in the computer network, e.g., the adaptive digital service units, the adaptive multijunction unit, and the adaptive office control units, must remain synchronized for the computer network to operate correctly. To reduce the chance that erroneous commands might cause one or more of the devices to operate in a mode that would destroy this synchrony, the following three rules are observed. First, a network unit ignores all undefined or inappropriate commands. The network unit also ignores any command that might have been modified by a transmission error. If the 5 error correcting bits in the element 73 containing the command indicate that a transmission error has occurred during the transmission of said element, the command is ignored.

Second, the time at which a given command is executed is determined by the microprocessor present in the network unit. The ACTIVATE and DEACTIVATE commands, which are executed only by adaptive multijunction units, must be executed as soon as possible after the command and address bytes are received. All other commands must wait until the complete frame is received before executing the commands.

Third, all network units, including the adaptive office control unit of the present invention, respond to a STATUS command with the address assigned to the unit and the status of the unit. This command may be used to verify that a previously sent command was properly executed.

Initialization

Upon being powered up or reset, the adaptive office control unit of the present invention assumes a default state in which data is transmitted and received in the framed data mode at a default data rate which is preferably 2.4 Kbits/sec. At this point, the adaptive office control unit does not have an assigned address. The adaptive office control unit may be assigned an address by a command from its command port or by receiving a frame which includes an ADDR_ASSIGN command and an address to be assigned. If the adaptive office control unit receives such a frame when it has not yet been assigned an address, it does not pass the frame on to the network units connected to it. Instead, it assumes the address given in the command.

Once the adaptive office control unit has acquired an address in this manner, it ignores all other ADDR_ASSIGN commands. That is, it transmits the frames containing the command, since the command is not addressed to it.

As noted above, each network unit, including the adaptive office control unit, responds to a STATUS command by sending a frame which includes an ACK command and data specifying the units type (i.e., adaptive multijunction unit, adaptive digital service unit, or adaptive office control unit), address, and status.

It should be noted that, with the exception of the RESET command, all the $ADDR_{13}$ ADDRESS and STATUS commands used can be executed from the command port of any device in the computer network. Hence, a user can ascertain the topology and addresses assigned within the computer network at any time, assuming that the user has been given access to this service, i.e., that the security flags in the various devices have been appropriately set. Furthermore, the user can assign his own addresses to the network units within the telephone system computer network if the user so desires. This feature is particularly well suited to users who maintain their own network using software executed from an adaptive digital service unit within the network.

Data Rate Changes

The speed at which data is transferred within the telephone system computer network is determined by SET_RATE commands. Such commands may be generated by a system controller connected to the command port of any device in the computer network or by the adaptive digital service unit connected to the master computer. Since an adaptive office control unit operates on data both from subscriber loops and from $T_1$ communication links, such a command determines both the rate at which data is received and transmitted on the subscriber loops and the number of copies of each data byte transmitted on the $T_1$ communication links.

A separate conditionally secure command is used to change the telephone system computer network to the 64 Kbits/sec unframed mode. After entering this mode, an adaptive office control unit can only execute a single command which causes it to resume operation in the framed data mode. When in the unframed mode, the adaptive office control unit scans for the specific sequence of bytes which signal that it should return to the framed data mode.

Synchronization

Since there are a number of possible operating speeds in the telephone system computer network, an adaptive office control unit according to the present invention can determine the operating speed of the telephone system computer network and resynchronize with it. The problem of network units operating at different speeds can arise when a network unit receives a SET_RATE command that is garbled by noise. Although this problem is primarily encountered when the telephone system computer network is operating in the adaptive mode, i.e., when the operating speed is being set in response to observed error rates, it can also occur in other modes, i.e., when a new adaptive office control unit is plugged into the telephone system computer network while the computer network is operating at a fixed rate.

In a computer network utilizing the present invention, this problem is solved as follows. All network units, including the adaptive office control unit, determine the system rate, i.e., the rate of the master adaptive digital service unit, and adjust themselves to that rate. When a network unit is out of synchronization for a predetermined period of time, it begins a scanning process to determine the system rate. The source of data which the network unit scans in its attempt to determine the system rate depends on the type of network unit and the relationship of that network unit to the master computer in the computer network. If the device is an adaptive office control unit, it continues to pass data as it had before, and after detecting that it does not know the system rate, it searches for the new rate until it resynchronizes using the algorithm described below. The adaptive office control unit scans the data arriving on the subscriber loop input port if it is connected to the master computer. All other adaptive office control units scan the data arriving from the $T_1$ communication link to determine the system rate.

An adaptive office control unit detects that it does not know the system rate when it has failed to detect the Barker synchronization code in a predetermined number of bytes. When an adaptive office control unit has seen a sufficient number of data bytes to conclude that it should have seen the Barker code if the system speed was correct, it assumes that synchronization has been lost. The number of data bytes searched may differ for different data rates. Typically, this number is at least 3000 bytes in the preferred embodiment of the present invention.

Once the adaptive office control unit detects that it does not know the system rate, it performs a search at the various possible system rates until it finds the Barker code at one of them. At each new rate, the adaptive office control unit searches for the Barker code. After a predetermined number of bytes have been examined without finding the Barker code, the adaptive office control unit selects the next lowest speed and repeats the process. If it is already at the lowest speed, it selects 38.4 Kbits/sec for the next speed. Hence, the adaptive office control unit will continue to cycle through all of the possible data rates until it finds the correct one.

Loopbacks

Each of the network units, including the adaptive office control units, in the telephone system computer network includes loopback capabilities in the preferred embodiment of the present invention. When placed in loopback mode, data entering the adaptive office control unit on an input thereto is copied to the corresponding output line thereof. The point at which the data is transferred determines the type of loopback. In a "near" loopback, the data entering the adaptive office control unit is copied back to the corresponding output line at the entrance point to the adaptive office control unit in question. Hence, a near loopback received from the $T_1$ communication link results in the data on each communication link from the channel bank being copied back to the corresponding output line without passing through the encryption and decryption circuitry. In a "far" loopback, the data is copied back at the point at which the data would normally leave the adaptive office control unit. For example, a far loopback received from the $T_1$ communication link would result in the data leaving the adaptive office control unit on subscriber loop 404 being copied back to subscriber loop 402. By comparing the response of the adaptive office control unit when near and far loopbacks are utilized, malfunctions within the adaptive office control unit may be detected. Loopbacks are initiated and canceled by specific system commands similar to those described above.

Command Execution

Referring again to FIG. 4, each of the controllers 428 and 430 monitors both the data streams controlled thereby to determine if a command intended for the adaptive office control unit in question is present on either of the data streams. In addition, new command data may be inserted by one of these controllers if the controller has been instructed to insert a command into the next frame leaving the data port.

A flow chart of the command execution cycle of each of the controllers is shown in FIG. 6. The controller searches for the Barker synchronization code which begins each data frame as shown at 802. If more than N bytes are seen without finding the Barker code, the controller initiates a search for the correct system rate as discussed above and as shown at 804 and 806. When the Barker code is found, the controller extracts the command and address data as shown at 808. These data immediately follow the Barker code. The controller also examines the ECC bits in the frame elements containing the command and address data to determine if transmission errors have occurred as shown at 810. If no transmission errors have occurred, the controller compares the address in the command data with the address assigned to the adaptive office control unit, as shown at 812. If the addresses match, the command is stored for execution at the end of the reception of the current frame as shown at 814. If the command data included transmission errors, the command is ignored.

The command data as well as the rest of the frame are copied to the appropriate output lines, as shown at 816. When the controller sees the last byte of the frame, it executes any stored commands as shown at 818 and 820.

Accordingly, an improved adaptive office control unit has been described. While preferred embodiments of the invention have been illustrated and described above, there is no intent to limit the scope of the invention to these or any other specific embodiments. The scope of the invention is defined by the spirit and language of the appended claims.

What is claimed is:

1. An office control unit for transferring digital data between first and second subscriber loops and the time-domain multiplexed communication channels of a multi-point communication network which includes a plurality of network units with at least two of said network units comprising said office control unit, said network units coupled to telephone system communication channels, each said network unit comprising means for transmitting and receiving digital data in a frame mode in which said data is organized into frames on said communication channels, each said frame including synchronization data, command data, error correcting data, and user data, each said network unit further comprising:

means for storing an address identifying said network unit;

means for receiving commands from other said network units in said computer network, said commands being specified by command data in a said frame received by said network unit;

means for generating command data in response to a received command included in said command data;

means for transmitting commands to other network units in said computer network, said transmitting means comprising means for inserting command data generated by said command data generating means into a said frame transmitted by said network unit; and means for executing a said received command specifying said stored address as the target thereof;

said office control unit further comprising:

loop input port means for receiving a said frame on said first subscriber loop;

loop output port means for transmitting a said frame on said second subscriber loop;

time-domain multiplexed input port means for receiving data from a first incoming channel of said time-domain multiplexed communication channels, said time-domain multiplexed input port means including first decrypting means for receiving primary channel words on said first incoming channel and for generating a data word from each said primary channel word, each said data word comprising a portion of a said frame, said frame being constructed from successive said data words, said time-domain multiplexed input port means being coupled to said loop output port means, said generated data words being transmitted by said loop output port means; and time-domain multiplexed output port means for transmitting data on a first outgoing channel on said time-domain multiplexed communication channels, said time-domain multiplexed output port means including first encrypting means, coupled to said first loop input port means, for receiving a data word comprising a portion of a said frame and for generating a primary channel word therefrom, said primary channel word being transmitted on said first outgoing channel.

2. The office control unit of claim 1 wherein said first decrypting means comprises means for copying predetermined bits of said primary channel word to the corresponding bits of said data word, and wherein said first encrypting means comprises means for copying the bits of said data word to the corresponding bits of said primary channel word.

3. The office control unit of claim 1 wherein said time-domain multiplexed input port means further comprises:

means for coupling said time-domain multiplexed input port means to a second incoming channel on said time-domain multiplexed communication channels;

means for receiving a secondary channel word on said second incoming channel, each said secondary channel word corresponding to a said received primary channel word; and second decrypting means for combining said secondary channel word with the said primary channel word corresponding thereto to form said data word, and wherein said time-domain multiplexed output port means further comprises:

means for coupling said time-domain multiplexed output port means to a second outgoing channel on said time-domain multiplexed communication channels;

second encrypting means for generating primary and secondary channel words from a said received data word and for transmitting said primary and secondary channel words respectively on said first and second outgoing channels, and wherein said office control unit further comprises:

means responsive to a predetermined said command for determining which of said second encrypting means and second decrypting or said first encrypting means and first decrypting means are operative.

4. The office control unit of claim 3 wherein said second decrypting means comprises means for decrypting two error encrypted words using an error correcting code, and wherein said second encrypting means comprises means encrypting said data word using said error correcting code.

5. The office control unit of claim 1 wherein said loop input port means and said time-domain multiplexed input port means each further comprises error detecting means for detecting transmission errors in said received frame, said error detecting means utilizing said error correcting data included in said frame.

6. The office control unit of claim 5 wherein each said error detecting means further comprises means for determining the rate at which errors are detected thereby and means, responsive to a predetermined one of said commands, for inserting data specifying said error rate into the said command data of a said frame transmitted by the said output port means corresponding to said input port means.

7. The office control unit of claim 5 wherein each said input port means further comprises means for preventing said command executing means from executing a said command received in a said frame for which a said error detecting means detected a transmission error.

8. The office control unit of claim 1 further comprising command port means for receiving commands to be executed by said office control unit or by another said network unit, each said command to be executed by another said network unit being transmitted in the said command data of a said frame transmitted by said time-domain multiplexed output port means or said loop output port means.

9. The office control unit of claim 1 wherein said loop input port means and said loop output port means further comprise means for setting the data rate at which said input port means receives said frames and said output port means transmits said frames, said data rate being selected from a plurality of loop data rates, wherein said rate setting means is responsive to a predetermined said command.

10. The office control unit of claim 9 wherein said time-domain multiplexed input port means further comprises means for combining a predetermined number of successively generated data words utilizing majority decision logic to form an error corrected data word, said predetermined number being determined by said data rate and wherein said first encrypting means further comprises means for generating said predetermined number of successive primary channel words by repeating each said encrypted channel word said predetermined number of times, said error corrected data words being transmitted by said loop output port means in place of said generated data words.

11. The office control unit of claim 1 further comprising means for transmitting and receiving data in a non-frame mode, wherein said loop input port means further comprising means for receiving non-frame data words at a predetermined loop data rate and generating data words therefrom, said data words being coupled to said time-domain multiplexed output port means; and said loop output port means further comprising means for generating a non-frame data word from a data word generated by said time-domain multiplexed input port means, said non-frame data word being transmitted on said second subscriber loop, said office control unit further comprising means for detecting a switch sequence comprising a predetermined sequence of data words, said office control unit entering said non-frame mode in response to a predetermined one of said commands, and said office control unit resuming transmission in said frame mode when said time-domain multiplexed input port means or said loop input port means receives said switch sequence.

12. The office control unit of claim 1 further comprising means responsive to a predetermined said command and a predetermined value for said stored address, for causing said stored address to match an address specified in said command.

13. The office control unit of claim 1 further comprising first loopback means responsive to a predetermined said command, for causing each said primary channel word received by said time-domain multiplexed input port means to be copied to said time-domain multiplexed output port means as said primary channel word is received by said office control unit until a second predetermined said command is received by said office control unit.

14. The office control unit of claim 1 further comprising second loopback means responsive to a predetermined said command, for causing each bit of a frame received on said first subscriber loop to be copied to said second subscriber loop as said bit is received by said loop input port means until a second predetermined said command is received by said office control unit.

* * * * *

UNITED STATES PATENT AND TRADEMARK OFFICE
CERTIFICATE OF CORRECTION

PATENT NO. : 4,924,460
DATED : May 8, 1990
INVENTOR(S) : Lubarsky, et al.

It is certified that error appears in the above-identified patent and that said Letters Patent is hereby corrected as shown below:

Column 9, Line 63, delete "a" before --long--.

Column 10, Line 48, delete "for" before --any--.

Column 13, Line 45, delete "questions" and insert therefor --question--.

Column 13, Line 50, delete "in then" and insert therefor --is then--.

Column 13, Line 67, delete "received" and insert therefor --receive--.

Column 14, Line 67, delete "predetermined" and insert therefor --number--.

Column 13, Line 11, insert "in" therefor before --Table II--.

Column 19, Line 8, delete "$ADDR_{13}$" and insert therefor --$ADDR\_$--.

Column 8, line 58, insert TABLE I, as shown on the attached sheets.

Column 13, line 15, insert TABLE II, as shown on the attached sheets.

Signed and Sealed this

Seventeenth Day of November, 1992

Attest:

DOUGLAS B. COMER

*Attesting Officer*　　　*Acting Commissioner of Patents and Trademarks*

TABLE I

| Data Rate (Kbits/sec) | Data Bits | Loop Speed (Kbits/sec) |
|---|---|---|
| 1.2 | 192 | 3.5 |
| 2.4 | 384 | 3.5 |
| 4.8 | 384 | 7.0 |
| 9.6 | 384 | 14.0 |
| 19.2 | 384 | 28.0 |
| 32.0 | 320 | 56.0 |
| 38.4 | 384 | 56.0 |

TABLE II

| DATA WORD x | STANDARD ERROR CORRECTING CODE | | IMPROVED ERROR CORRECTING CODE | |
|---|---|---|---|---|
| | $^1X$ | $^2X$ | $^1Y$ | $^2Y$ |
| | 1 2 3 4 5 6 7 8 | A B C D E F G H | 1 2 4 7 A B $\overline{D}$ $\overline{G}$ | 3 5 6 8 C E F H |
| 0 | 0 0 0 0 0 0 0 0 | 0 0 0 0 0 0 0 0 | 0 0 0 0 0 0 1 1 | 0 0 0 0 0 0 1 1 |
| 1 | 1 0 0 0 0 0 0 0 | 1 0 0 1 1 1 0 0 | 1 0 0 0 1 0 0 1 | 0 0 0 0 0 1 0 1 |
| 2 | 0 1 0 0 0 0 0 0 | 0 1 0 0 1 1 1 0 | 0 1 0 0 0 1 1 0 | 0 0 0 0 0 1 0 1 |
| 3 | 1 1 0 0 0 0 0 0 | 1 1 0 1 0 0 1 0 | 1 1 0 0 1 1 0 0 | 0 0 0 0 0 0 1 1 |
| 4 | 0 0 1 0 0 0 0 0 | 0 0 1 0 0 1 1 1 | 0 0 0 0 0 0 1 0 | 1 0 0 0 1 0 0 0 |
| 5 | 1 0 1 0 0 0 0 0 | 1 0 1 1 1 0 1 1 | 1 0 0 0 1 0 0 0 | 1 0 0 0 1 1 1 0 |
| 6 | 0 1 1 0 0 0 0 0 | 0 1 1 0 1 0 0 1 | 0 1 0 0 0 1 1 1 | 1 0 0 0 1 1 1 0 |
| 7 | 1 1 1 0 0 0 0 0 | 1 1 1 1 0 1 0 1 | 1 1 0 0 1 1 0 1 | 1 0 0 0 1 0 0 0 |
| 8 | 0 0 0 1 0 0 0 0 | 1 0 0 0 1 1 1 1 | 0 0 1 0 1 0 1 0 | 0 0 0 0 0 1 0 0 |
| 9 | 1 0 0 1 0 0 0 0 | 0 0 0 1 0 0 1 1 | 1 0 1 0 0 0 0 0 | 0 0 0 0 0 0 1 0 |
| 10 | 0 1 0 1 0 0 0 0 | 1 1 0 0 0 0 0 1 | 0 1 1 0 1 1 1 1 | 0 0 0 0 0 0 1 0 |
| 11 | 1 1 0 1 0 0 0 0 | 0 1 0 1 1 1 0 1 | 1 1 1 0 0 1 0 1 | 0 0 0 0 0 1 0 0 |
| 12 | 0 0 1 1 0 0 0 0 | 1 0 1 0 1 0 0 0 | 0 0 1 0 1 0 1 1 | 1 0 0 0 1 1 1 1 |
| 13 | 1 0 1 1 0 0 0 0 | 0 0 1 1 0 1 0 0 | 1 0 1 0 0 0 0 1 | 1 0 0 0 1 0 0 1 |
| 14 | 0 1 1 1 0 0 0 0 | 1 1 1 0 0 1 1 0 | 0 1 1 0 1 1 1 0 | 1 0 0 0 1 0 0 1 |
| 15 | 1 1 1 1 0 0 0 0 | 0 1 1 1 1 0 1 0 | 1 1 1 0 0 1 0 0 | 1 0 0 0 1 1 1 1 |
| 16 | 0 0 0 0 1 0 0 0 | 1 1 0 1 1 0 1 1 | 0 0 0 0 1 1 0 0 | 0 1 0 0 0 1 1 0 |
| 17 | 1 0 0 0 1 0 0 0 | 0 1 0 0 0 1 1 1 | 1 0 0 0 0 1 1 0 | 0 1 0 0 0 0 0 0 |
| 18 | 0 1 0 0 1 0 0 0 | 1 0 0 1 0 1 0 1 | 0 1 0 0 1 0 0 1 | 0 1 0 0 0 0 0 0 |
| 19 | 1 1 0 0 1 0 0 0 | 0 0 0 0 1 0 0 1 | 1 1 0 0 0 0 1 1 | 0 1 0 0 0 1 1 0 |
| 20 | 0 0 1 0 1 0 0 0 | 1 1 1 1 1 1 0 0 | 0 0 0 0 1 1 0 1 | 1 1 0 0 1 1 0 1 |
| 21 | 1 0 1 0 1 0 0 0 | 0 1 1 0 0 0 0 0 | 1 0 0 0 0 1 1 1 | 1 1 0 0 1 0 1 1 |
| 22 | 0 1 1 0 1 0 0 0 | 1 0 1 1 0 0 1 0 | 0 1 0 0 1 0 0 0 | 1 1 0 0 1 0 1 1 |
| 23 | 1 1 1 0 1 0 0 0 | 0 0 1 0 1 1 1 0 | 1 1 0 0 0 0 1 0 | 1 1 0 0 1 1 0 1 |
| 24 | 0 0 0 1 1 0 0 0 | 0 1 0 1 0 1 0 0 | 0 0 1 0 0 1 0 1 | 0 1 0 0 0 0 0 1 |
| 25 | 1 0 0 1 1 0 0 0 | 1 1 0 0 1 0 0 0 | 1 0 1 0 1 1 1 1 | 0 1 0 0 0 1 1 1 |
| 26 | 0 1 0 1 1 0 0 0 | 0 0 0 1 1 0 1 0 | 0 1 1 0 0 0 0 0 | 0 1 0 0 0 1 1 1 |
| 27 | 1 1 0 1 1 0 0 0 | 1 0 0 0 1 1 0 | 1 1 1 0 1 0 1 0 | 0 1 0 0 0 0 0 1 |
| 28 | 0 0 1 1 1 0 0 0 | 0 1 1 1 0 0 1 1 | 0 0 1 0 0 1 0 0 | 1 1 0 0 1 0 1 0 |
| 29 | 1 0 1 1 1 0 0 0 | 1 1 1 0 1 1 1 1 | 1 0 1 0 1 1 1 0 | 1 1 0 0 1 1 0 0 |
| 30 | 0 1 1 1 1 0 0 0 | 0 0 1 1 1 1 0 1 | 0 1 1 0 0 0 0 1 | 1 1 0 0 1 1 0 0 |
| 31 | 1 1 1 1 1 0 0 0 | 1 0 1 0 0 0 0 1 | 1 1 1 0 1 0 1 1 | 1 1 0 0 1 0 1 0 |
| 32 | 0 0 0 0 0 1 0 0 | 1 1 1 1 0 0 0 1 | 0 0 0 0 1 1 0 1 | 0 0 1 0 1 0 1 0 |
| 33 | 1 0 0 0 0 1 0 0 | 0 1 1 0 1 1 0 1 | 1 0 0 0 0 1 1 1 | 0 0 1 0 1 1 0 0 |
| 34 | 0 1 0 0 0 1 0 0 | 1 0 1 1 1 1 1 1 | 0 1 0 0 1 0 0 0 | 0 0 1 0 1 1 0 0 |
| 35 | 1 1 0 0 0 1 0 0 | 0 0 1 0 0 0 1 1 | 1 1 0 0 0 0 1 0 | 0 0 1 0 1 0 1 0 |
| 36 | 0 0 1 0 0 1 0 0 | 1 1 0 1 0 1 1 0 | 0 0 0 0 1 1 0 0 | 1 0 1 0 0 0 0 1 |
| 37 | 1 0 1 0 0 1 0 0 | 0 1 0 0 1 0 1 0 | 1 0 0 0 0 1 1 0 | 1 0 1 0 0 1 1 1 |
| 38 | 0 1 1 0 0 1 0 0 | 1 0 0 1 1 0 0 0 | 0 1 0 0 1 0 0 1 | 1 0 1 0 0 1 1 1 |

```
39 11100100  00000100  11000011  10100001
40 00010100  01111110  00100100  00101101
41 10010100  11100010  10101110  00101011
42 01010100  00110000  01100001  00101011
43 11010100  10101100  11101011  00101101
44 00110100  01011001  00100101  10100110
45 10110100  11000101  10101111  10100000
46 01110100  00010111  01100000  10100000
47 11110100  10001011  11101010  10100110
48 00001100  00101010  00000010  01101111
49 10001100  10110110  10001000  01101001
50 01001100  01100100  01000111  01101001
51 11001100  11111000  11001101  01101111
52 00101100  00001101  00000011  11100100
53 10101100  10010001  10001001  11100010
54 01101100  01000011  01000110  11100010
55 11101100  11011111  11001100  11100100
56 00011100  10100101  00101011  01101000
57 10011100  00111001  10100001  01101110
58 01011100  11101011  01101110  01101110
59 11011100  01110111  11100100  01101000
60 00111100  10000010  00101010  11100011
61 10111100  00011110  10100000  11100101
62 01111100  11001100  01101111  11100101
63 11111100  01010000  11100101  11100011
64 00000010  11100100  00011111  00001001
65 10000010  01111000  10010101  00001111
66 01000010  10101010  01011010  00001111
67 11000010  00110110  11010000  00001001
68 00100010  11000011  00011110  10000010
69 10100010  01011111  10010100  10000100
70 01100010  10001101  01011011  10000100
71 11100010  00010001  11010001  10000010
72 00010010  01101011  00110110  00001110
73 10010010  11110111  10111100  00001000
74 01010010  00100101  01110011  00001000
75 11010010  10111001  11111001  00001110
76 00110010  01001100  00110111  10000101
77 10110010  11010000  10111101  10000011
78 01110010  00000010  01110010  10000011
79 11110010  10011110  11111000  10000101
80 00001010  00111111  00010000  01001100
81 10001010  10100011  10011010  01001010
82 01001010  01110001  01010101  01001010
83 11001010  11101101  11011111  01001100
84 00101010  00011000  00010001  11000111
85 10101010  10000100  10011011  11000001
86 01101010  01010110  01010100  11000001
```

| | | | | |
|---|---|---|---|---|
| 87 | 11101010 | 11001010 | 11011110 | 11000111 |
| 88 | 00011010 | 10110000 | 00111001 | 01001011 |
| 89 | 10011010 | 00101100 | 10110011 | 01001101 |
| 90 | 01011010 | 11111110 | 01111100 | 01001101 |
| 91 | 11011010 | 01100010 | 11110110 | 01001011 |
| 92 | 00111010 | 10010111 | 00111000 | 11000000 |
| 93 | 10111010 | 00001011 | 10110010 | 11000110 |
| 94 | 01111010 | 11011001 | 01111101 | 11000110 |
| 95 | 11111010 | 01000101 | 11110111 | 11000000 |
| 96 | 00000110 | 00010101 | 00010001 | 00100000 |
| 97 | 10000110 | 10001001 | 10011011 | 00100110 |
| 98 | 01000110 | 01011011 | 01010100 | 00100110 |
| 99 | 11000110 | 11000111 | 11011110 | 00100000 |
| 100 | 00100110 | 00110010 | 00010000 | 10101011 |
| 101 | 10100110 | 10101110 | 10011010 | 10101101 |
| 102 | 01100110 | 01111100 | 01010101 | 10101101 |
| 103 | 11100110 | 11100000 | 11011111 | 10101011 |
| 104 | 00010110 | 10011010 | 00111000 | 00100111 |
| 105 | 10010110 | 00000110 | 10110010 | 00100001 |
| 106 | 01010110 | 11010100 | 01111101 | 00100001 |
| 107 | 11010110 | 01001000 | 11110111 | 00100111 |
| 108 | 00110110 | 10111101 | 00111001 | 10101100 |
| 109 | 10110110 | 00100001 | 10110011 | 10101010 |
| 110 | 01110110 | 11110011 | 01111100 | 10101010 |
| 111 | 11110110 | 01101111 | 11110110 | 10101100 |
| 112 | 00001110 | 11001110 | 00011110 | 01100101 |
| 113 | 10001110 | 01010010 | 10010100 | 01100011 |
| 114 | 01001110 | 10000000 | 01011011 | 01100011 |
| 115 | 11001110 | 00011100 | 11010001 | 01100101 |
| 116 | 00101110 | 11101001 | 00011111 | 11101110 |
| 117 | 10101110 | 01110101 | 10010101 | 11101000 |
| 118 | 01101110 | 10100111 | 01011010 | 11101000 |
| 119 | 11101110 | 00111011 | 11010000 | 11101110 |
| 120 | 00011110 | 01000001 | 00110111 | 01100010 |
| 121 | 10011110 | 11011101 | 10111101 | 01100100 |
| 122 | 01011110 | 00001111 | 01110010 | 01100100 |
| 123 | 11011110 | 10010011 | 11111000 | 01100010 |
| 124 | 00111110 | 01100110 | 00110110 | 11101001 |
| 125 | 10111110 | 11111010 | 10111100 | 11101111 |
| 126 | 01111110 | 00101000 | 01110011 | 11101111 |
| 127 | 11111110 | 10110100 | 11111001 | 11101001 |
| 128 | 00000001 | 01110010 | 00000100 | 00011011 |
| 129 | 10000001 | 11101110 | 10001110 | 00011101 |
| 130 | 01000001 | 00111100 | 01000001 | 00011101 |
| 131 | 11000001 | 10100000 | 11001011 | 00011011 |
| 132 | 00100001 | 01010101 | 00000101 | 10010000 |
| 133 | 10100001 | 11001001 | 10001111 | 10010110 |
| 134 | 01100001 | 00011011 | 01000000 | 10010110 |

| | | | | |
|---|---|---|---|---|
| 135 | 1 1 1 0 0 0 0 1 | 1 0 0 0 0 1 1 1 | 1 1 0 0 1 0 1 0 | 1 0 0 1 0 0 0 0 |
| 136 | 0 0 0 1 0 0 0 1 | 1 1 1 1 1 1 0 1 | 0 0 1 0 1 1 0 1 | 0 0 0 1 1 1 0 0 |
| 137 | 1 0 0 1 0 0 0 1 | 0 1 1 0 0 0 0 1 | 1 0 1 0 0 1 1 1 | 0 0 0 1 1 0 1 0 |
| 138 | 0 1 0 1 0 0 0 1 | 1 0 1 1 0 0 1 1 | 0 1 1 0 1 0 0 0 | 0 0 0 1 1 0 1 0 |
| 139 | 1 1 0 1 0 0 0 1 | 0 0 1 0 1 1 1 1 | 1 1 1 0 0 0 1 0 | 0 0 0 1 1 1 0 0 |
| 140 | 0 0 1 1 0 0 0 1 | 1 1 0 1 1 0 1 0 | 0 0 1 0 1 1 0 0 | 1 0 0 1 0 1 1 1 |
| 141 | 1 0 1 1 0 0 0 1 | 0 1 0 0 0 1 1 0 | 1 0 1 0 0 1 1 0 | 1 0 0 1 0 0 0 1 |
| 142 | 0 1 1 1 0 0 0 1 | 1 0 0 1 0 1 0 0 | 0 1 1 0 1 0 0 1 | 1 0 0 1 0 0 0 1 |
| 143 | 1 1 1 1 0 0 0 1 | 0 0 0 0 1 0 0 0 | 1 1 1 0 0 0 1 1 | 1 0 0 1 0 1 1 1 |
| 144 | 0 0 0 0 1 0 0 1 | 1 0 1 0 1 0 0 1 | 0 0 0 0 1 0 1 1 | 0 1 0 1 1 1 1 0 |
| 145 | 1 0 0 0 1 0 0 1 | 0 0 1 1 0 1 0 1 | 1 0 0 0 0 0 0 1 | 0 1 0 1 1 0 0 0 |
| 146 | 0 1 0 0 1 0 0 1 | 1 1 1 0 0 1 1 1 | 0 1 0 0 1 1 1 0 | 0 1 0 1 1 0 0 0 |
| 147 | 1 1 0 0 1 0 0 1 | 0 1 1 1 1 0 1 1 | 1 1 0 0 0 1 0 0 | 0 1 0 1 1 1 1 0 |
| 148 | 0 0 1 0 1 0 0 1 | 1 0 0 0 1 1 1 0 | 0 0 0 0 1 0 1 0 | 1 1 0 1 0 1 0 1 |
| 149 | 1 0 1 0 1 0 0 1 | 0 0 0 1 0 0 1 0 | 1 0 0 0 0 0 0 0 | 1 1 0 1 0 0 1 1 |
| 150 | 0 1 1 0 1 0 0 1 | 1 1 0 0 0 0 0 0 | 0 1 0 0 1 1 1 1 | 1 1 0 1 0 0 1 1 |
| 151 | 1 1 1 0 1 0 0 1 | 0 1 0 1 1 1 0 0 | 1 1 0 0 0 1 0 1 | 1 1 0 1 0 1 0 1 |
| 152 | 0 0 0 1 1 0 0 1 | 0 0 1 0 0 1 1 0 | 0 0 1 0 0 0 1 0 | 0 1 0 1 1 0 0 1 |
| 153 | 1 0 0 1 1 0 0 1 | 1 0 1 1 1 0 1 0 | 1 0 1 0 1 0 0 0 | 0 1 0 1 1 1 1 1 |
| 154 | 0 1 0 1 1 0 0 1 | 0 1 1 0 1 0 0 0 | 0 1 1 0 0 1 1 1 | 0 1 0 1 1 1 1 1 |
| 155 | 1 1 0 1 1 0 0 1 | 1 1 1 1 0 1 0 0 | 1 1 1 0 1 1 0 1 | 0 1 0 1 1 0 0 1 |
| 156 | 0 0 1 1 1 0 0 1 | 0 0 0 0 0 0 0 1 | 0 0 1 0 0 0 1 1 | 1 1 0 1 0 0 1 0 |
| 157 | 1 0 1 1 1 0 0 1 | 1 0 0 1 1 1 0 1 | 1 0 1 0 1 0 0 1 | 1 1 0 1 0 1 0 0 |
| 158 | 0 1 1 1 1 0 0 1 | 0 1 0 0 1 1 1 1 | 0 1 1 0 0 1 1 0 | 1 1 0 1 0 1 0 0 |
| 159 | 1 1 1 1 1 0 0 1 | 1 1 0 1 0 0 1 1 | 1 1 1 0 1 1 0 0 | 1 1 0 1 0 0 1 0 |
| 160 | 0 0 0 0 0 1 0 1 | 1 0 0 0 0 0 1 1 | 0 0 0 0 1 0 1 0 | 0 0 1 1 0 0 1 0 |
| 161 | 1 0 0 0 0 1 0 1 | 0 0 0 1 1 1 1 1 | 1 0 0 0 0 0 0 0 | 0 0 1 1 0 1 0 0 |
| 162 | 0 1 0 0 0 1 0 1 | 1 1 0 0 1 1 0 1 | 0 1 0 0 1 1 1 1 | 0 0 1 1 0 1 0 0 |
| 163 | 1 1 0 0 0 1 0 1 | 0 1 0 1 0 0 0 1 | 1 1 0 0 0 1 0 1 | 0 0 1 1 0 0 1 0 |
| 164 | 0 0 1 0 0 1 0 1 | 1 0 1 0 0 1 0 0 | 0 0 0 0 1 0 1 1 | 1 0 1 1 1 0 0 1 |
| 165 | 1 0 1 0 0 1 0 1 | 0 0 1 1 1 0 0 0 | 1 0 0 0 0 0 0 1 | 1 0 1 1 1 1 1 1 |
| 166 | 0 1 1 0 0 1 0 1 | 1 1 1 0 1 0 1 0 | 0 1 0 0 1 1 1 0 | 1 0 1 1 1 1 1 1 |
| 167 | 1 1 1 0 0 1 0 1 | 0 1 1 1 0 1 1 0 | 1 1 0 0 0 1 0 0 | 1 0 1 1 1 0 0 1 |
| 168 | 0 0 0 1 0 1 0 1 | 0 0 0 0 1 1 0 0 | 0 0 1 0 0 0 1 1 | 0 0 1 1 0 1 0 1 |
| 169 | 1 0 0 1 0 1 0 1 | 1 0 0 1 0 0 0 0 | 1 0 1 0 1 0 0 1 | 0 0 1 1 0 0 1 1 |
| 170 | 0 1 0 1 0 1 0 1 | 0 1 0 0 0 0 1 0 | 0 1 1 0 0 1 1 0 | 0 0 1 1 0 0 1 1 |
| 171 | 1 1 0 1 0 1 0 1 | 1 1 0 1 1 1 1 0 | 1 1 1 0 1 1 0 0 | 0 0 1 1 0 1 0 1 |
| 172 | 0 0 1 1 0 1 0 1 | 0 0 1 0 1 0 1 1 | 0 0 1 0 0 0 1 0 | 1 0 1 1 1 1 1 0 |
| 173 | 1 0 1 1 0 1 0 1 | 1 0 1 1 0 1 1 1 | 1 0 1 0 1 0 0 0 | 1 0 1 1 1 0 0 0 |
| 174 | 0 1 1 1 0 1 0 1 | 0 1 1 0 0 1 0 1 | 0 1 1 0 0 1 1 1 | 1 0 1 1 1 0 0 0 |
| 175 | 1 1 1 1 0 1 0 1 | 1 1 1 1 1 0 0 1 | 1 1 1 0 1 1 0 1 | 1 0 1 1 1 1 1 0 |
| 176 | 0 0 0 0 1 1 0 1 | 0 1 0 1 1 0 0 0 | 0 0 0 0 0 1 0 1 | 0 1 1 1 0 1 1 1 |
| 177 | 1 0 0 0 1 1 0 1 | 1 1 0 0 0 1 0 0 | 1 0 0 0 1 1 1 1 | 0 1 1 1 0 0 0 1 |
| 178 | 0 1 0 0 1 1 0 1 | 0 0 0 1 0 1 1 0 | 0 1 0 0 0 0 0 0 | 0 1 1 1 0 0 0 1 |
| 179 | 1 1 0 0 1 1 0 1 | 1 0 0 0 1 0 1 0 | 1 1 0 0 1 0 1 0 | 0 1 1 1 0 1 1 1 |
| 180 | 0 0 1 0 1 1 0 1 | 0 1 1 1 1 1 1 1 | 0 0 0 0 0 1 0 0 | 1 1 1 1 1 1 0 0 |
| 181 | 1 0 1 0 1 1 0 1 | 1 1 1 0 0 0 1 1 | 1 0 0 0 1 1 1 0 | 1 1 1 1 1 0 1 0 |
| 182 | 0 1 1 0 1 1 0 1 | 0 0 1 1 0 0 0 1 | 0 1 0 0 0 0 0 1 | 1 1 1 1 1 0 1 0 |

| | | | | |
|---|---|---|---|---|
| 183 | 11101101 | 10101101 | 11001011 | 11111100 |
| 184 | 00011101 | 11010111 | 00101100 | 01110000 |
| 185 | 10011101 | 01001011 | 10100110 | 01110110 |
| 186 | 01011101 | 10011001 | 01101001 | 01110110 |
| 187 | 11011101 | 00000101 | 11100011 | 01110000 |
| 188 | 00111101 | 11110000 | 00101101 | 11111011 |
| 189 | 10111101 | 01101100 | 10100111 | 11111101 |
| 190 | 01111101 | 10111110 | 01101000 | 11111101 |
| 191 | 11111101 | 00100010 | 11100010 | 11111011 |
| 192 | 00000011 | 10010110 | 00011000 | 00010001 |
| 193 | 10000011 | 00001010 | 10010010 | 00010111 |
| 194 | 01000011 | 11011000 | 01011101 | 00010111 |
| 195 | 11000011 | 01000100 | 11010111 | 00010001 |
| 196 | 00100011 | 10110001 | 00011001 | 10011010 |
| 197 | 10100011 | 00101101 | 10010011 | 10011100 |
| 198 | 01100011 | 11111111 | 01011100 | 10011100 |
| 199 | 11100011 | 01100011 | 11010110 | 10011010 |
| 200 | 00010011 | 00011001 | 00110001 | 00010110 |
| 201 | 10010011 | 10000101 | 10111011 | 00010000 |
| 202 | 01010011 | 01010111 | 01110100 | 00010000 |
| 203 | 11010011 | 11001011 | 11111110 | 00010110 |
| 204 | 00110011 | 00111110 | 00110000 | 10011101 |
| 205 | 10110011 | 10100010 | 10111010 | 10011011 |
| 206 | 01110011 | 01110000 | 01110101 | 10011011 |
| 207 | 11110011 | 11101100 | 11111111 | 10011101 |
| 208 | 00001011 | 01001101 | 00010111 | 01010100 |
| 209 | 10001011 | 11010001 | 10011101 | 01010010 |
| 210 | 01001011 | 00000011 | 01010010 | 01010010 |
| 211 | 11001011 | 10011111 | 11011000 | 01010100 |
| 212 | 00101011 | 01101010 | 00010110 | 11011111 |
| 213 | 10101011 | 11110110 | 10011100 | 11011001 |
| 214 | 01101011 | 00100100 | 01010011 | 11011001 |
| 215 | 11101011 | 10111000 | 11011001 | 11011111 |
| 216 | 00011011 | 11000010 | 00111110 | 01010011 |
| 217 | 10011011 | 01011110 | 10110100 | 01010101 |
| 218 | 01011011 | 10001100 | 01111011 | 01010101 |
| 219 | 11011011 | 00010000 | 11110001 | 01010011 |
| 220 | 00111011 | 11100101 | 00111111 | 11011000 |
| 221 | 10111011 | 01111001 | 10110101 | 11011110 |
| 222 | 01111011 | 10101011 | 01111010 | 11011110 |
| 223 | 11111011 | 00110111 | 11110000 | 11011000 |
| 224 | 00000111 | 01100111 | 00010110 | 00111000 |
| 225 | 10000111 | 11111011 | 10011100 | 00111110 |
| 226 | 01000111 | 00101001 | 01010011 | 00111110 |
| 227 | 11000111 | 10110101 | 11011001 | 00111000 |
| 228 | 00100111 | 01000000 | 00010111 | 10110011 |
| 229 | 10100111 | 11011100 | 10011101 | 10110101 |
| 230 | 01100111 | 00001110 | 01010010 | 10110101 |

| | | | | |
|---|---|---|---|---|
| 231 | 1 1 1 0 0 1 1 1 | 1 0 0 1 0 0 1 0 | 1 1 0 1 1 0 0 0 | 1 0 1 1 0 0 1 1 |
| 232 | 0 0 0 1 0 1 1 1 | 1 1 1 0 1 0 0 0 | 0 0 1 1 1 1 1 1 | 0 0 1 1 1 1 1 1 |
| 233 | 1 0 0 1 0 1 1 1 | 0 1 1 1 0 1 0 0 | 1 0 1 1 0 1 0 1 | 0 0 1 1 1 0 0 1 |
| 234 | 0 1 0 1 0 1 1 1 | 1 0 1 0 0 1 1 0 | 0 1 1 1 1 0 1 0 | 0 0 1 1 1 0 0 1 |
| 235 | 1 1 0 1 0 1 1 1 | 0 0 1 1 1 0 1 0 | 1 1 1 1 0 0 0 0 | 0 0 1 1 1 1 1 1 |
| 236 | 0 0 1 1 0 1 1 1 | 1 1 0 0 1 1 1 1 | 0 0 1 1 1 1 1 0 | 1 0 1 1 0 1 0 0 |
| 237 | 1 0 1 1 0 1 1 1 | 0 1 0 1 0 0 1 1 | 1 0 1 1 0 1 0 0 | 1 0 1 1 0 0 1 0 |
| 238 | 0 1 1 1 0 1 1 1 | 1 0 0 0 0 0 0 1 | 0 1 1 1 1 0 1 1 | 1 0 1 1 0 0 1 0 |
| 239 | 1 1 1 1 0 1 1 1 | 0 0 0 1 1 1 0 1 | 1 1 1 1 0 0 0 1 | 1 0 1 1 0 1 0 0 |
| 240 | 0 0 0 0 1 1 1 1 | 1 0 1 1 1 1 0 0 | 0 0 0 1 1 0 0 1 | 0 1 1 1 1 1 0 1 |
| 241 | 1 0 0 0 1 1 1 1 | 0 0 1 0 0 0 0 0 | 1 0 0 1 0 0 1 1 | 0 1 1 1 1 0 1 1 |
| 242 | 0 1 0 0 1 1 1 1 | 1 1 1 1 0 0 1 0 | 0 1 0 1 1 1 0 0 | 0 1 1 1 1 0 1 1 |
| 243 | 1 1 0 0 1 1 1 1 | 0 1 1 0 1 1 1 0 | 1 1 0 1 0 1 1 0 | 0 1 1 1 1 1 0 1 |
| 244 | 0 0 1 0 1 1 1 1 | 1 0 0 1 1 0 1 1 | 0 0 0 1 1 0 0 0 | 1 1 1 1 0 1 1 0 |
| 245 | 1 0 1 0 1 1 1 1 | 0 0 0 0 0 1 1 1 | 1 0 0 1 0 0 1 0 | 1 1 1 1 0 0 0 0 |
| 246 | 0 1 1 0 1 1 1 1 | 1 1 0 1 0 1 0 1 | 0 1 0 1 1 1 0 1 | 1 1 1 1 0 0 0 0 |
| 247 | 1 1 1 0 1 1 1 1 | 0 1 0 0 1 0 0 1 | 1 1 0 1 0 1 1 1 | 1 1 1 1 0 1 1 0 |
| 248 | 0 0 0 1 1 1 1 1 | 0 0 1 1 0 0 1 1 | 0 0 1 1 0 0 0 0 | 0 1 1 1 1 0 1 0 |
| 249 | 1 0 0 1 1 1 1 1 | 1 0 1 0 1 1 1 1 | 1 0 1 1 1 0 1 0 | 0 1 1 1 1 1 0 0 |
| 250 | 0 1 0 1 1 1 1 1 | 0 1 1 1 1 1 0 1 | 0 1 1 1 0 1 0 1 | 0 1 1 1 1 1 0 0 |
| 251 | 1 1 0 1 1 1 1 1 | 1 1 1 0 0 0 0 1 | 1 1 1 1 1 1 1 1 | 0 1 1 1 1 0 1 0 |
| 252 | 0 0 1 1 1 1 1 1 | 0 0 0 1 0 1 0 0 | 0 0 1 1 0 0 0 1 | 1 1 1 1 0 0 0 1 |
| 253 | 1 0 1 1 1 1 1 1 | 1 0 0 0 1 0 0 0 | 1 0 1 1 1 0 1 1 | 1 1 1 1 0 1 1 1 |
| 254 | 0 1 1 1 1 1 1 1 | 0 1 0 1 1 0 1 0 | 0 1 1 1 0 1 0 0 | 1 1 1 1 0 1 1 1 |
| 255 | 1 1 1 1 1 1 1 1 | 1 1 0 0 0 1 1 0 | 1 1 1 1 1 1 1 0 | 1 1 1 1 0 0 0 1 |